(12) United States Patent
Lawrence et al.

(10) Patent No.: US 7,055,469 B2
(45) Date of Patent: Jun. 6, 2006

(54) COMBUSTION ENGINE VARIABLE COMPRESSION RATIO APPARATUS AND METHOD

(75) Inventors: Keith E. Lawrence, Peoria, IL (US); Bryan E. Strawbridge, Dunlap, IL (US); Charles H. Dutart, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 338 days.

(21) Appl. No.: 10/369,050

(22) Filed: Feb. 18, 2003

(65) Prior Publication Data

US 2004/0159292 A1 Aug. 19, 2004

(51) Int. Cl.
*F02B 75/00* (2006.01)

(52) U.S. Cl. ............................. 123/48 AA; 123/78 AA
(58) Field of Classification Search ............... 123/48 A, 123/48 AA, 48 B, 78 A, 78 AA, 78 E, 78 F
See application file for complete search history.

(56) References Cited

U.S. PATENT DOCUMENTS

| | | | |
|---|---|---|---|
| 2,206,027 A | * | 7/1940 | Butler .................. 123/78 AA |
| 4,144,851 A | | 3/1979 | Prosen |
| 4,190,024 A | | 2/1980 | Davis |
| 4,449,489 A | * | 5/1984 | Williams .................. 123/78 R |
| 4,873,947 A | | 10/1989 | Ryan, III et al. |
| 5,063,883 A | | 11/1991 | Dingess |
| 5,109,810 A | | 5/1992 | Christenson |
| 5,193,493 A | | 3/1993 | Ickes |
| 5,329,893 A | | 7/1994 | Drangel et al. |
| 5,427,063 A | | 6/1995 | Anderson |
| 5,476,072 A | | 12/1995 | Guy |
| 5,682,854 A | | 11/1997 | Ozawa |
| 5,934,228 A | | 8/1999 | Wheat |
| 6,450,154 B1 | | 9/2002 | Choi |

FOREIGN PATENT DOCUMENTS

| JP | 58165544 A | * | 9/1983 |
|---|---|---|---|
| JP | 60230549 A | * | 11/1985 |

* cited by examiner

*Primary Examiner*—Noah P. Kamen
(74) *Attorney, Agent, or Firm*—Michael L. Woods; Steve D. Lundquist

(57) ABSTRACT

An apparatus and method for varying a compression ratio of an engine having a block and a head mounted thereto. The apparatus and method includes a cylinder having a block portion and a head portion, a piston linearly movable in the block portion of the cylinder, a cylinder plug linearly movable in the head portion of the cylinder, and a valve located in the cylinder plug and operable to provide controlled fluid communication with the block portion of the cylinder.

34 Claims, 21 Drawing Sheets

_Fig_8_

Fig_12.
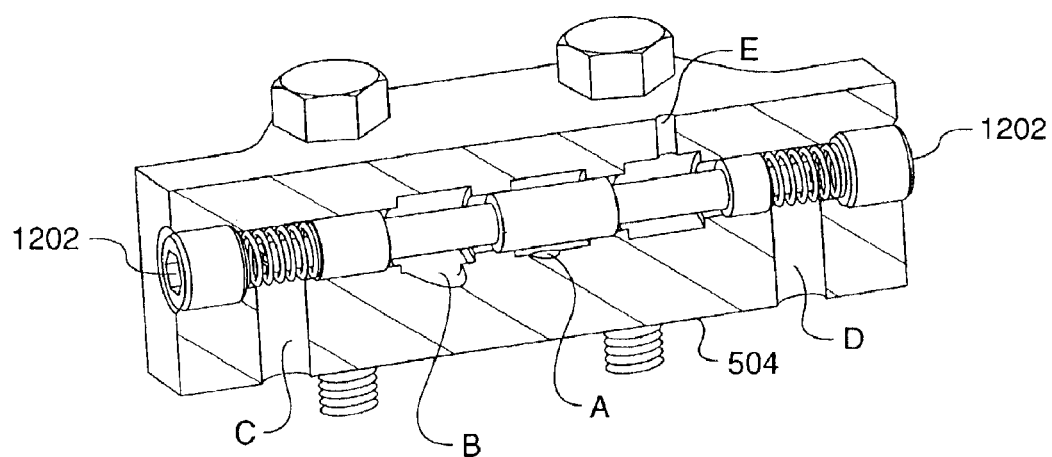
Fig_13.
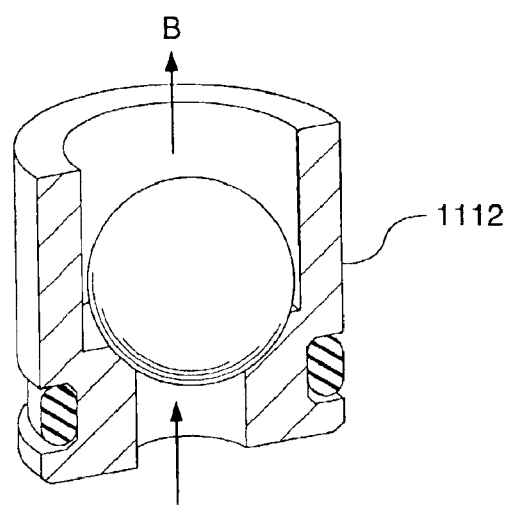

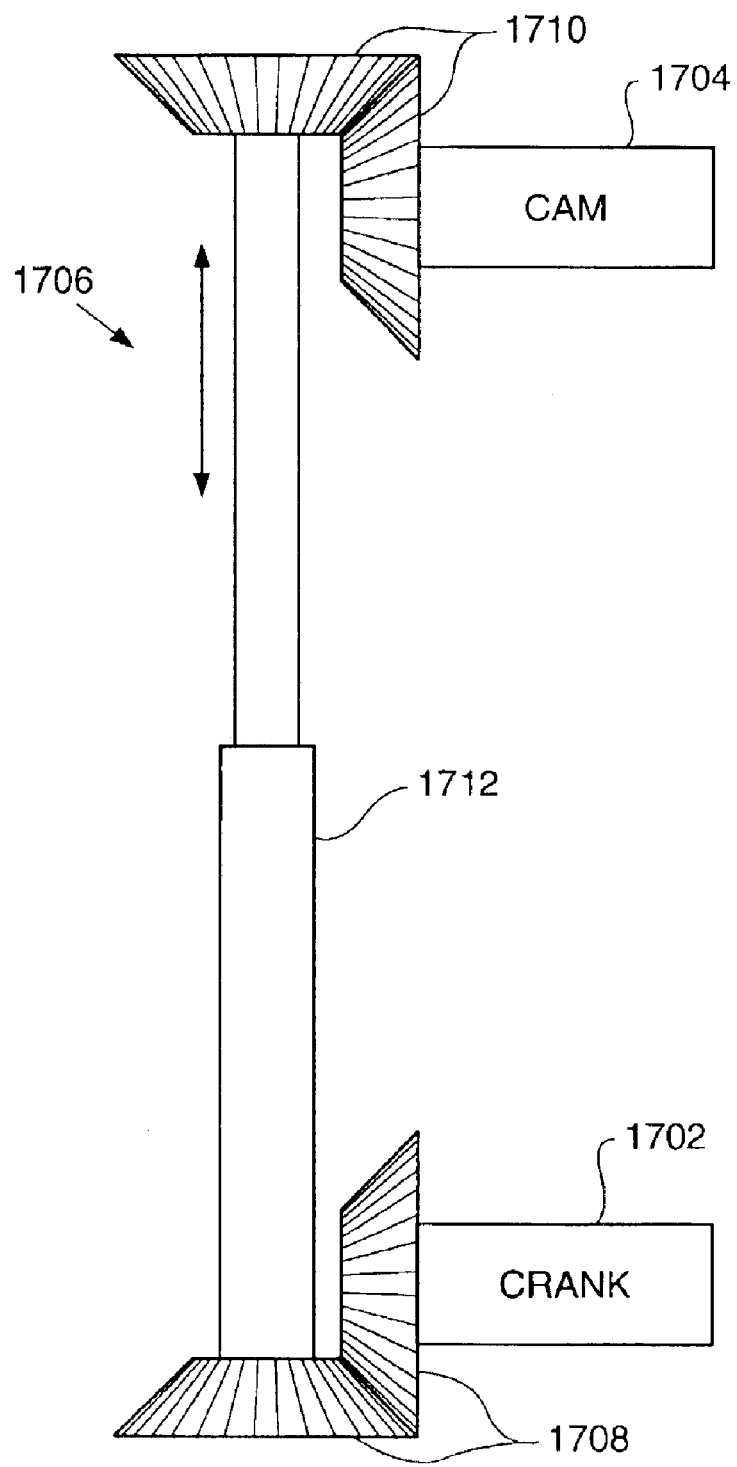
Fig_17_

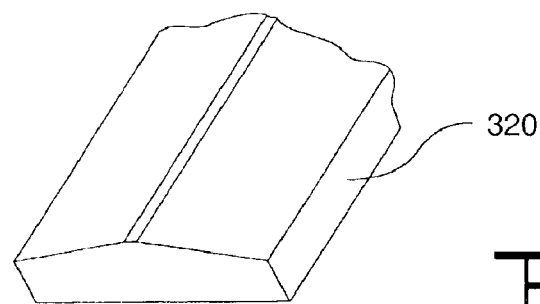
Fig_18_
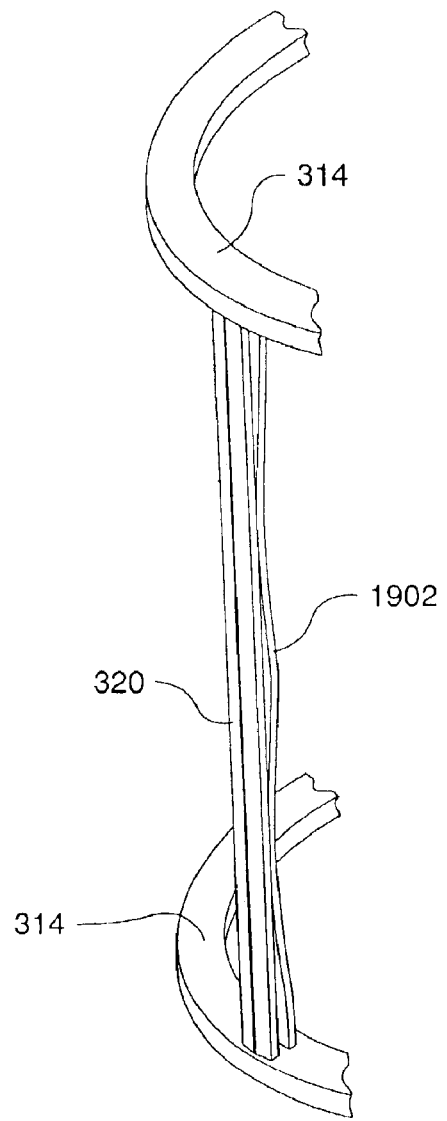
Fig_19_

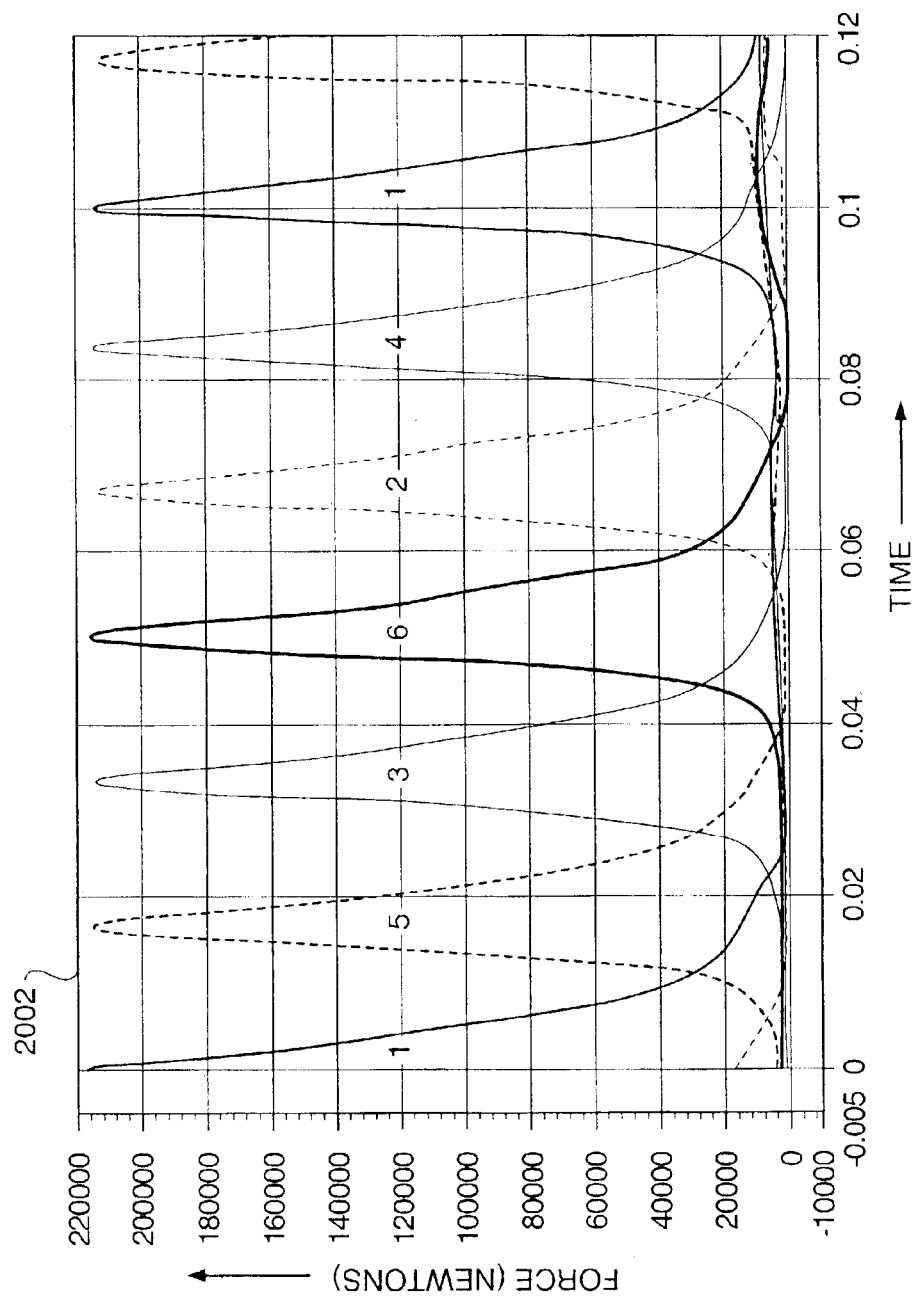

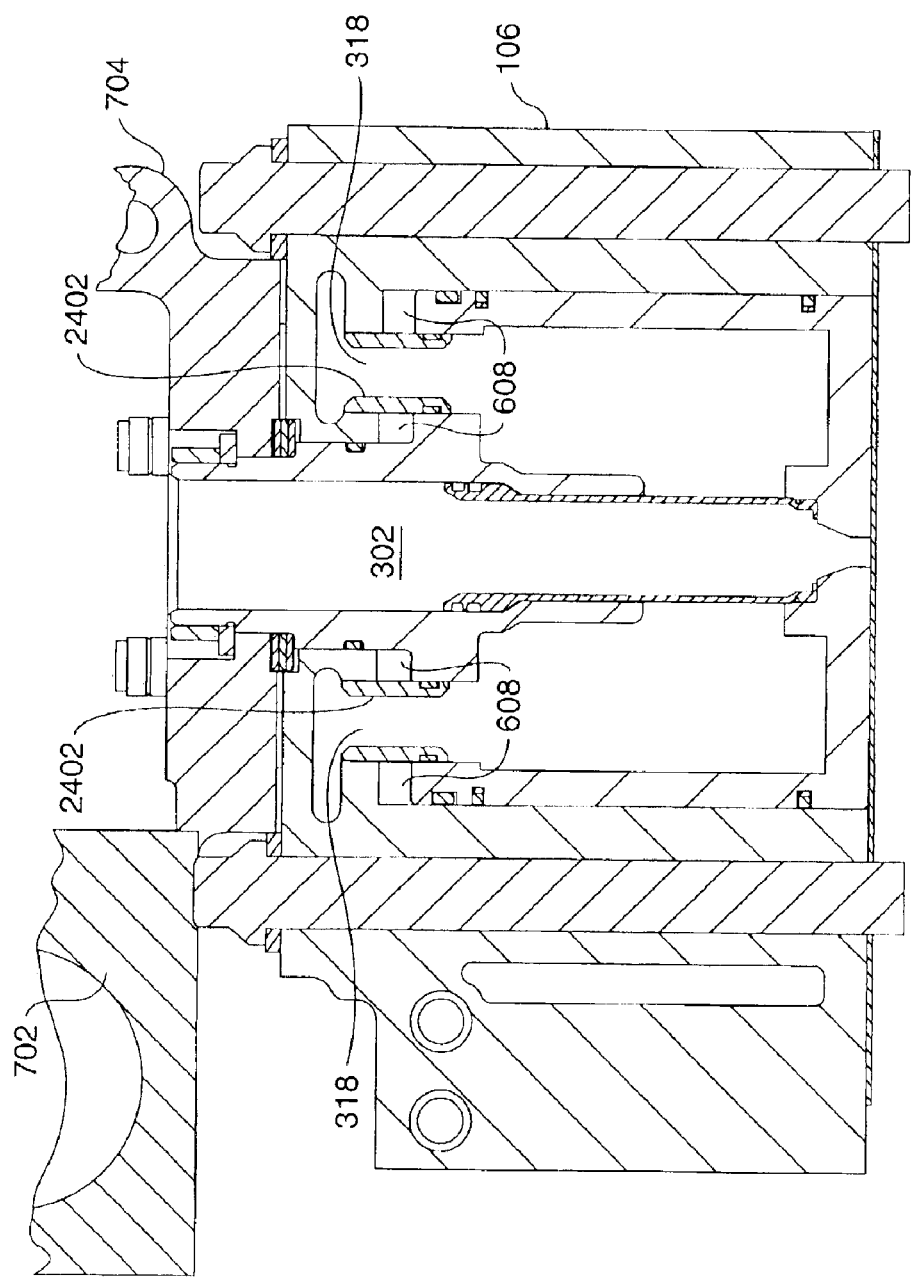

COMBUSTION ENGINE VARIABLE COMPRESSION RATIO APPARATUS AND METHOD

This invention was made with Government support under DE-FC05-00OR22806 awarded by DOE. The Government has certain rights in this invention.

TECHNICAL FIELD

This invention relates generally to an apparatus and method for varying a compression ratio of an engine and, more particularly, to an apparatus and method for dynamically varying a compression ratio of an engine using a sliding head plug in a cylinder to control a volume of the cylinder.

BACKGROUND

Internal combustion engines are typically designed to operate at optimum efficiency and performance by the selection and design of a desired compression ratio, i.e., a ratio of maximum to minimum cylinder volume, during operating conditions. However, circumstances exist in which it may be desired to change a compression ratio, perhaps dynamically. For example, a compression ratio which may be desired under normal engine run conditions may not be effective during engine start conditions.

Various methods have been devised for varying the compression ratio of an engine. For example, in U.S. Pat. No. 5,682,854, Ozawa discloses a variable compression ratio engine which changes the compression ratio by alternating between a normal operating mode to a Miller cycle operating mode. The compression ratio can thus be changed from one range, e.g., 15–17, to a second range, e.g., 11–13. Ozawa's disclosed invention, however, cannot vary the compression ratio over the entire range of possibilities, for example from 11 to 17, but rather is intended to "switch" the compression ratio from one value to another. It has been found, moreover, that operating in Miller cycle, i.e., varying actuation of intake valves to change compression ratio, can in itself only achieve a limited variance of compression ratio. For example, varying compression ratio by varying valve timing may only effectively change compression ratio over a range of about 1–2. That is, by varying intake valves, it is typically feasible to vary compression ratio from exemplary values of 11:1 to 13:1.

Another common technique for varying compression ratio is to alter the volume of a cylinder by some method. For example, U.S. Pat. No. 4,144,851 to Prosen, U.S. Pat. No. 4,873,947 to Ryan, III et al., and U.S. Pat. No. 5,329,893 to Drangel et al. all indicate engines which can vary the compression ratio by changing the volume of the cylinders. However, in these cases, the methods employed require extensive modifications of the engines themselves, including the engine block. These modifications are very costly and add a great deal of complexity to the engines. Furthermore, they require extensive redesign of auxiliary systems, such as air intake and exhaust systems, to allow these systems to move in cooperation with the changing engine configurations.

Another method for varying compression ratio is to incorporate auxiliary chambers which vary the effective volume of the cylinders. An example of this is found in U.S. Pat. No. 6,450,154 to Choi. A secondary chamber having a secondary piston is used to change the compression ratio of a primary chamber. The apparatus of Choi, however, alters the geometry of the cylinder, i.e., the combustion chamber, to achieve a variable compression ratio. In many instances, for example when a uniform fuel distribution in the cylinder is desired, altering the geometry of the cylinder is detrimental to operation of the engine.

The present invention is directed to overcoming one or more of the problems as set forth above.

SUMMARY OF THE INVENTION

In one aspect of the present invention an apparatus for varying a compression ratio of an engine having a block and a head mounted thereto is disclosed. The apparatus includes a cylinder having a block portion and a head portion, a piston linearly movable in the block portion of the cylinder, a cylinder plug linearly movable in the head portion of the cylinder, and a valve located in the cylinder plug and operable to provide controlled fluid communication with the block portion of the cylinder.

In another aspect of the present invention a method for varying a compression ratio of an engine is disclosed. The method includes the steps of determining a desired compression ratio, determining a desired linear position of a cylinder plug located in a head portion of a cylinder as a function of the desired compression ratio, actuating a hydraulic system to controllably move the cylinder plug to the desired position, and controllably actuating at least one of an intake and an exhaust valve located in the cylinder plug and operable to provide fluid communication with a block portion of the cylinder from the desired position of the cylinder plug.

BRIEF DESCRIPTION OF THE DRAWINGS

FIG. 12 is a cross section view of a spool valve suitable for use with the present invention;

FIG. 13 is a cross section view of a check valve suitable for use with the present invention;

FIG. 16a is a diagrammatic illustration of a side view of a platform and head assembly with the platform in a raised position;

FIG. 16b is a diagrammatic illustration of a side view of a platform and head assembly with the platform in a lowered position;

FIG. 17 is a block diagram illustrating a sliding spline coupling from a crankshaft to a camshaft;

FIG. 18 is a diagrammatic illustration of a portion of an Apex seal;

FIG. 19 is a diagrammatic illustration of an Apex seal assembly;

FIG. 20 is a graph depicting combustion events in an engine;

FIG. 21b is an enlarged view of a portion of a piston ring located on the cylinder plug of FIG. 21a;

FIG. 24 is a cross section diagrammatic illustration of a cylinder plug located in a head.

DETAILED DESCRIPTION

Figure 1:
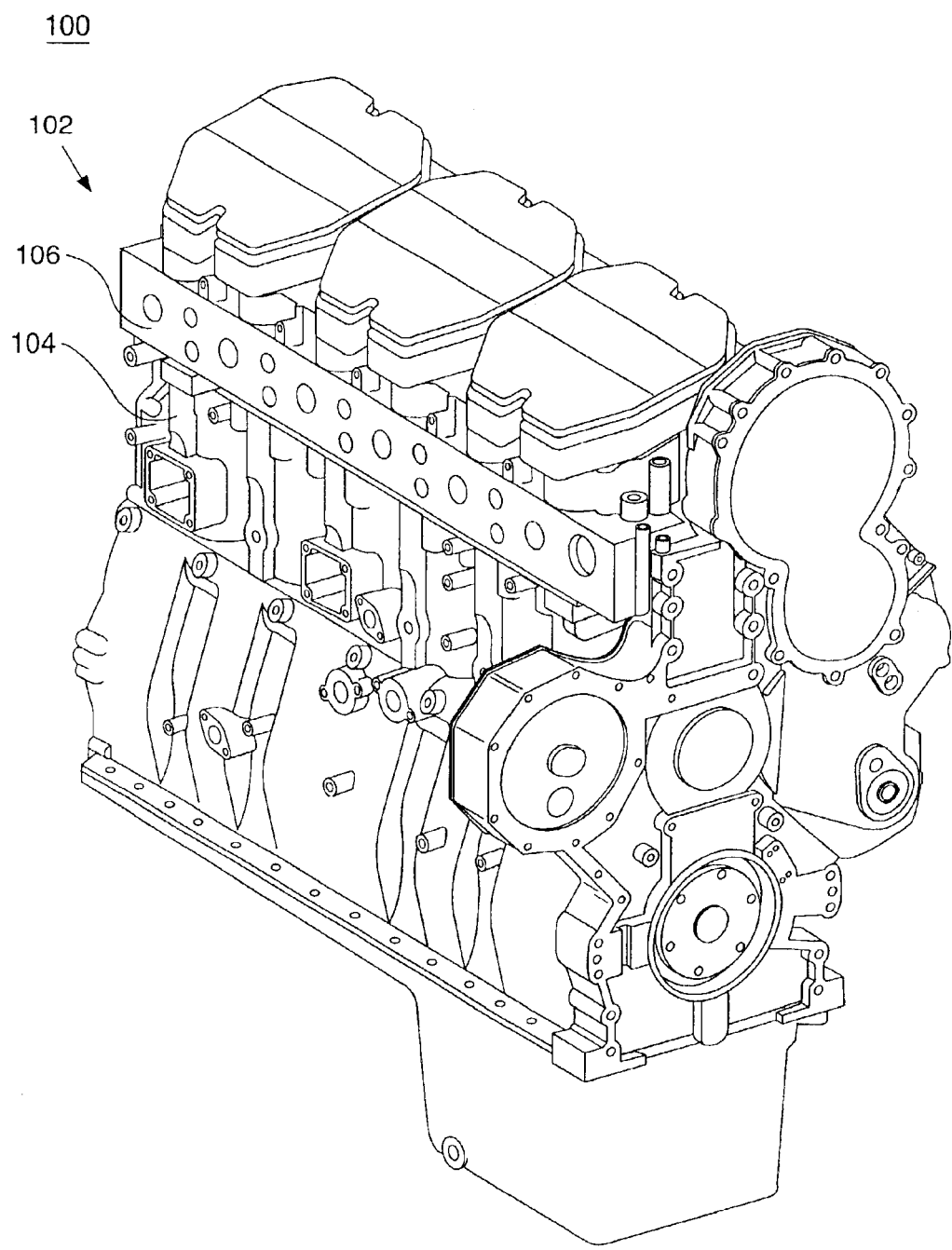
FIG. 1 is a diagrammatic illustration of an engine suitable for use with the present invention.

Referring to the drawings, an apparatus 100 and method for varying a compression ratio of a combustion engine 102 is shown. With particular reference to FIG. 1, the engine 102 includes a block 104 and a head 106 mounted to the block 104 in a manner typically well known in the art.

Figure 2:
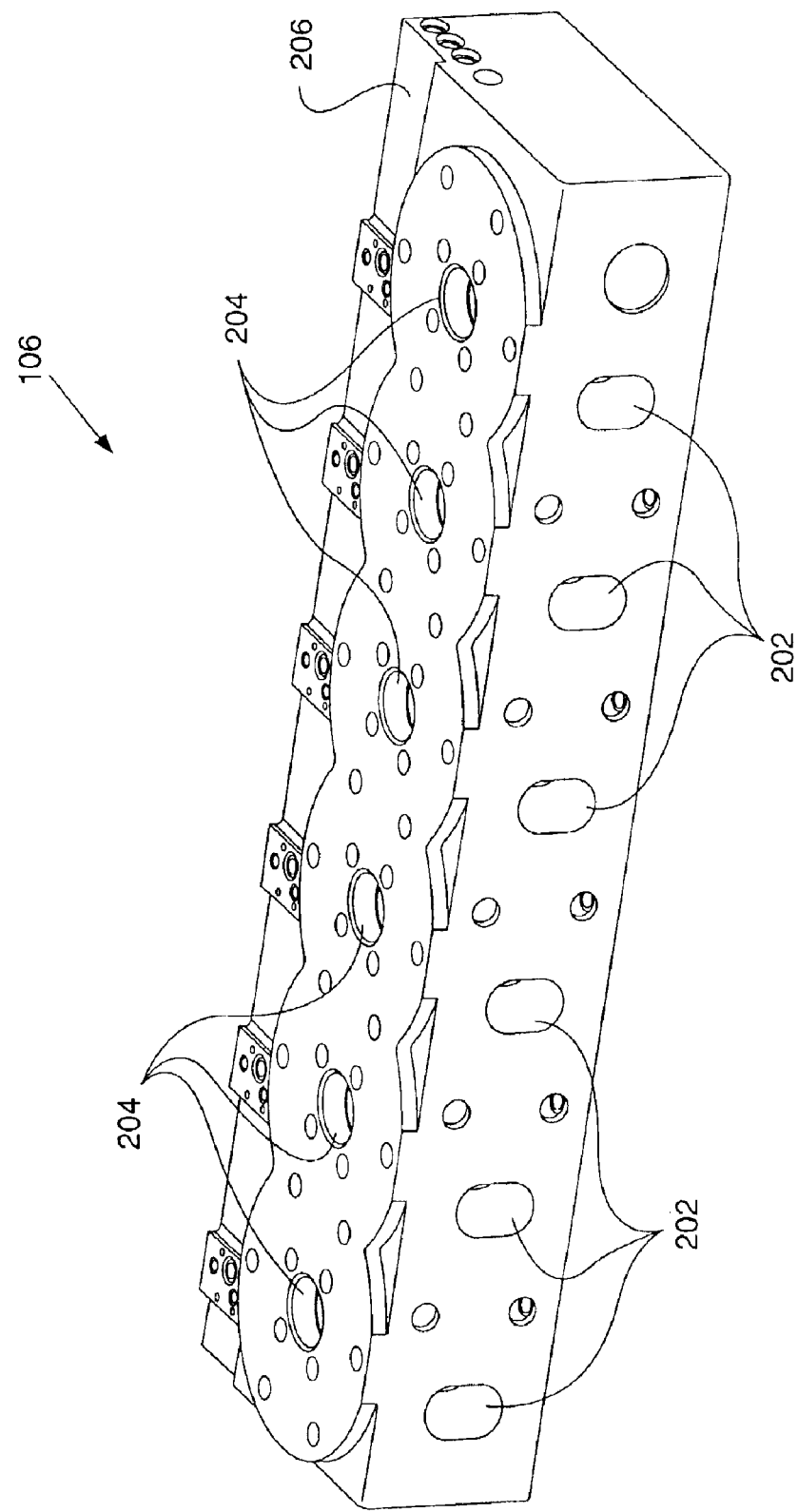
FIG. 2 is a diagrammatic illustration of a head for the engine of FIG. 1.

Referring to FIG. 2, a diagrammatic illustration of the head 106 as suited for use with the present invention is shown. The head 106 is representative of an engine 102 having 6 cylinders. However, other types of engines having a corresponding head configuration may be used as well, for example an engine having 4, 8, 12, 16 or any number of cylinders, either in-line, v-configured, or some other such arrangement.

Figure 5:
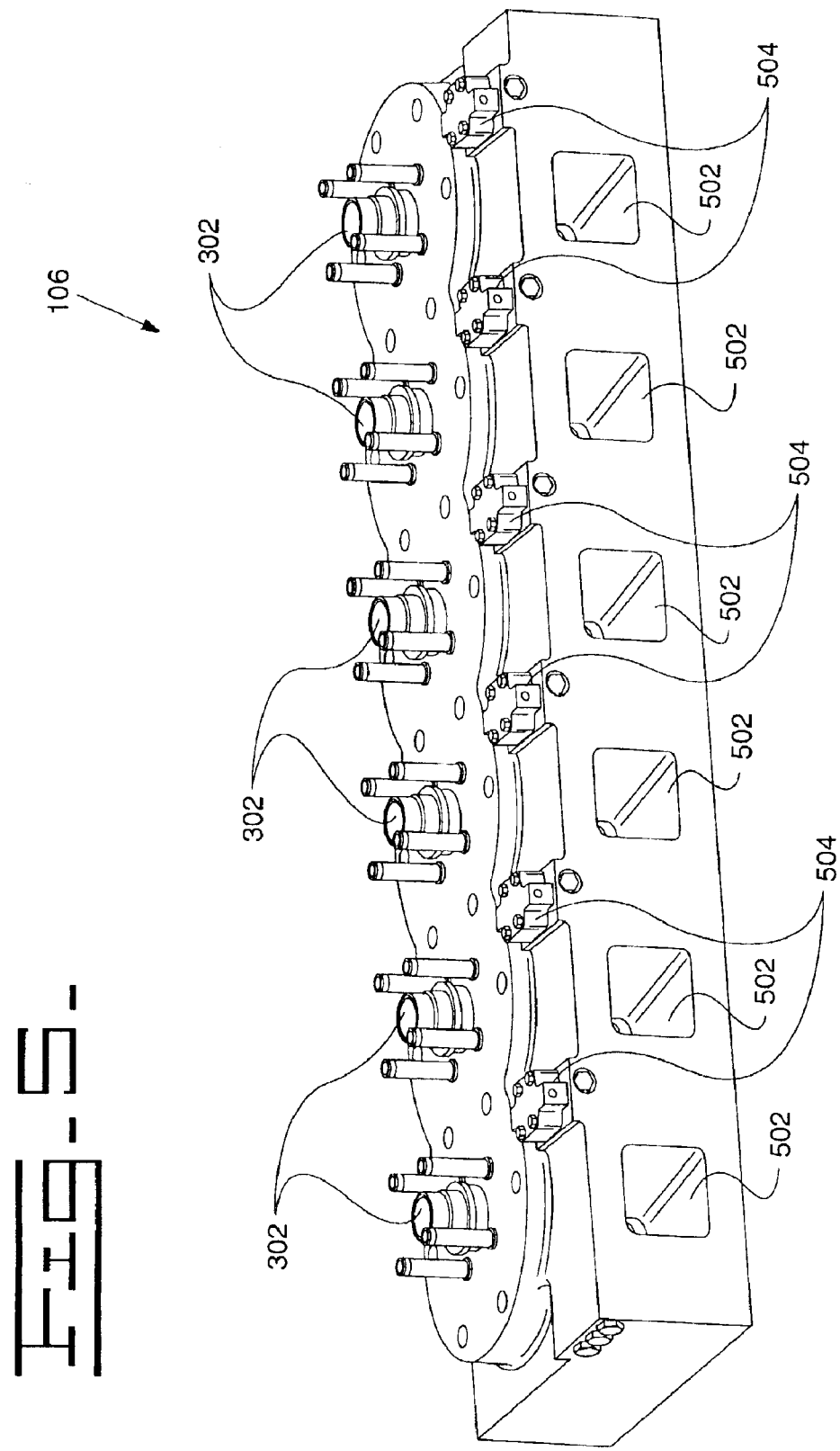
FIG. 5 is a diagrammatic illustration of a head with cylinder plugs.
Figure 6:
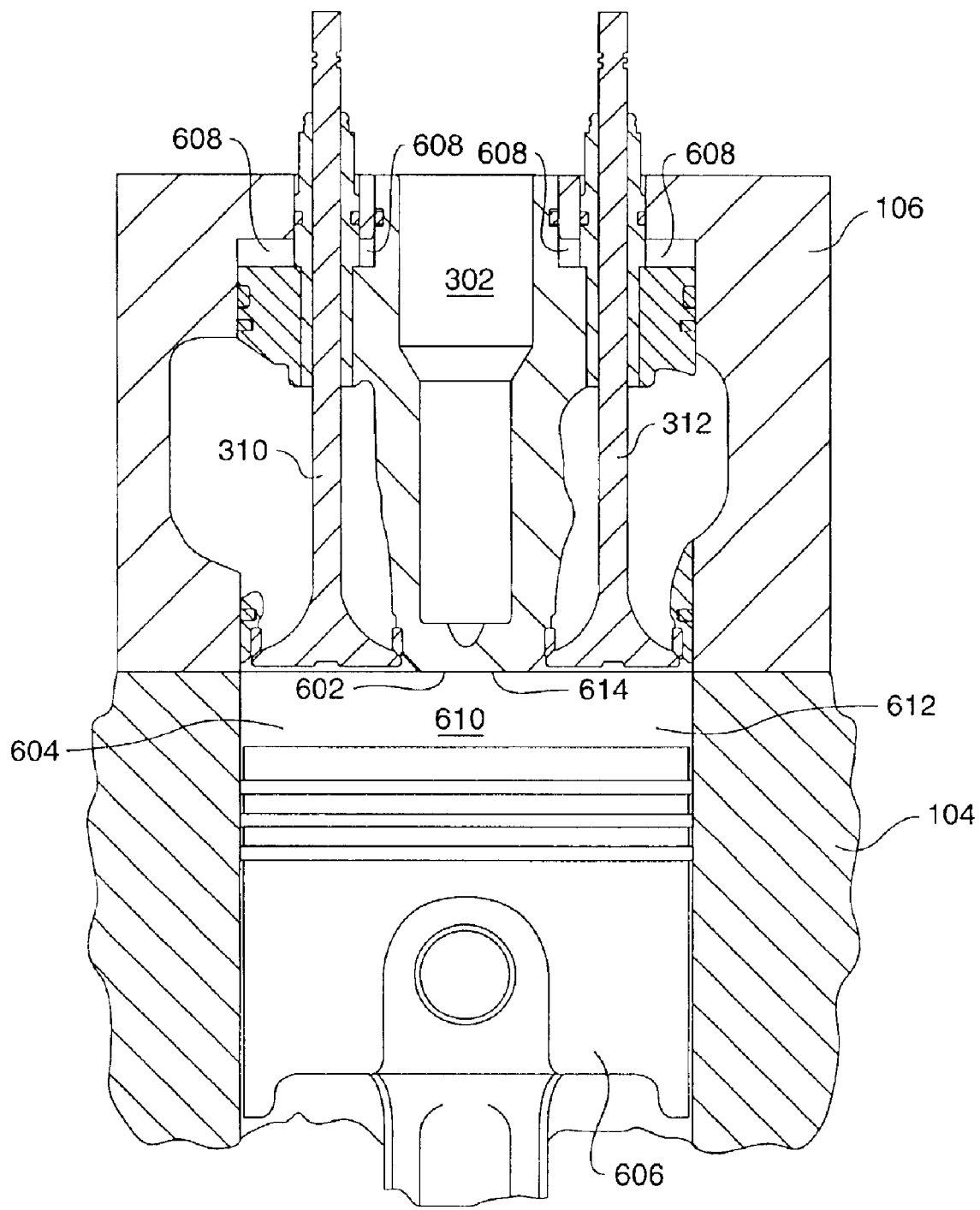
FIG. 6 is a diagrammatic illustration of a cylinder plug and a piston in combination in a cylinder.

The head 106 of FIG. 2 is positioned to show a set of exhaust ports 202, for example one exhaust port 202 for each cylinder. Although it is not shown in FIG. 2, the head 106 also includes a corresponding set of intake ports 502, as is shown in FIG. 5. Each exhaust port 202 may provide passage for exhaust gases from a corresponding cylinder 610, such as shown in FIG. 6, and each intake port 502 may provide passage for intake gases, e.g., air, air and fuel mixture, and the like, to the cylinder 610.

The head 106 may include an inner portion 204 and an outer portion 206, as is described in more detail below.

Figure 3:
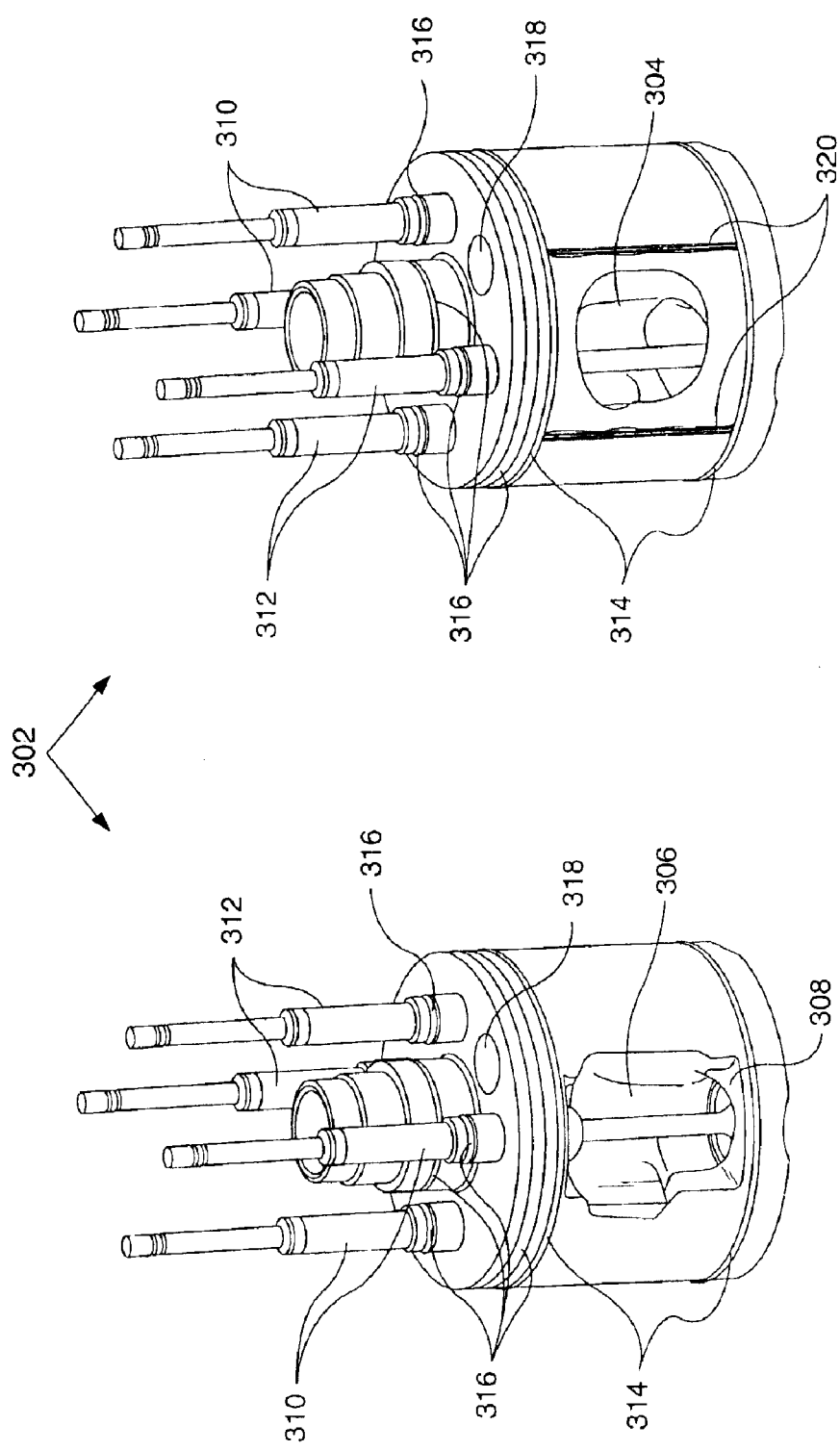
FIG. 3a is a first view of a diagrammatic illustration of a cylinder plug.
FIG. 3b is a second view of a diagrammatic illustration of a cylinder plug.

Referring to FIGS. 3a and 3b, diagrammatic illustrations of two views of a cylinder plug 302 are shown. The cylinder plug 302 is configured to be located in the inner portion 204 of the head 106, as is shown in FIG. 5, and is linearly movable in the head 106.

The cylinder plug 302 may include at least one valve 310,312 to provide controlled fluid communication with the cylinder 610. For example, the cylinder plug 302 may include at least one intake valve 310, e.g., two intake valves 310 as shown in FIGS. 3a and 3b. Furthermore, the cylinder plug 302 may include at least one exhaust valve 312, e.g., two exhaust valves 312 as shown in FIGS. 3a and 3b.

FIG. 3a depicts a view of the cylinder plug 302 which shows an intake passageway 306 to provide fluid communication from the intake port 502 to the intake valve 310. The intake passageway 306 may include a chamfered surface 308 to provide a more fluid transition from the intake port 502 to the intake passageway 306 regardless of the position of the cylinder plug 302 with respect to the intake port 502.

FIG. 3b depicts a view of the cylinder plug 302 which shows an exhaust passageway 304 to provide fluid communication from the exhaust valve 312 to the exhaust port 202. Although not shown, the exhaust passageway 304 may include a chamfered surface as well to provide a more fluid transition from the exhaust passageway 304 to the exhaust port 202.

At least one cylinder plug piston ring 314 is located on the cylinder plug 302 to provide a seal for intake, combustion and exhaust gases during operation of the engine 102. For example, two piston rings 314 may be included, one located above and one located below the intake and exhaust passageways 306,304. In addition, at least one vertical apex seal 320 may also be used to provide further isolation. For example, as shown in FIG. 3b, two apex seals 320 are used, one on each side of the exhaust passageway 304. The cylinder plug piston rings 314 and the apex seals 320 are described in more detail below.

A plurality of hydraulic seal rings 316 are located at various positions on the cylinder plug 302 to provide isolation of a hydraulic space 608, which is depicted in FIG. 6 and defined and described in detail below.

At least one coolant passageway 318 provides an opening through which coolant, e.g., water, may flow through the cylinder plug 302. The coolant passageway 318 is described in more detail below.

Figure 4:
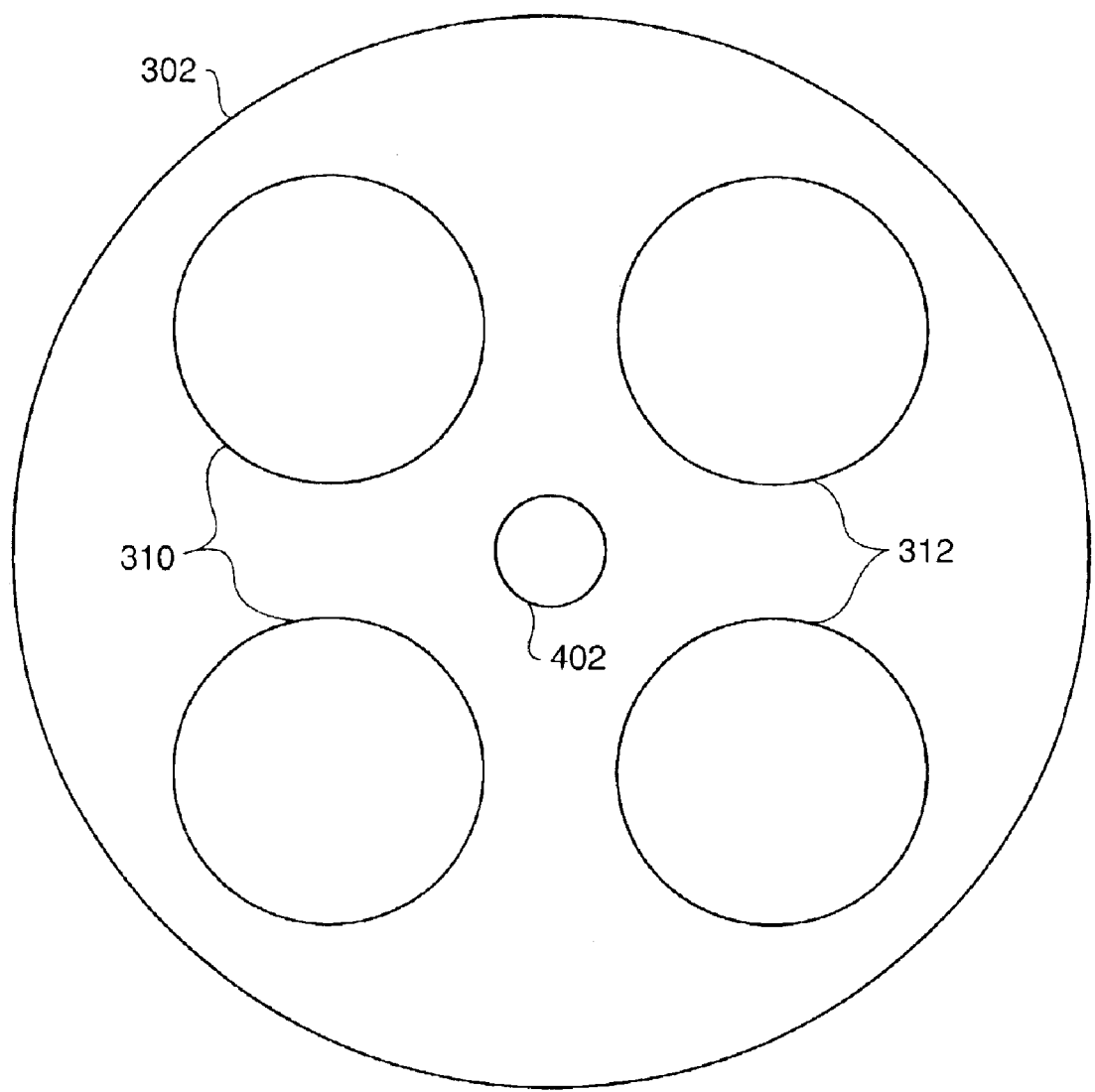
FIG. 4 is a third view of a diagrammatic illustration of a cylinder plug.
Figure 21A:
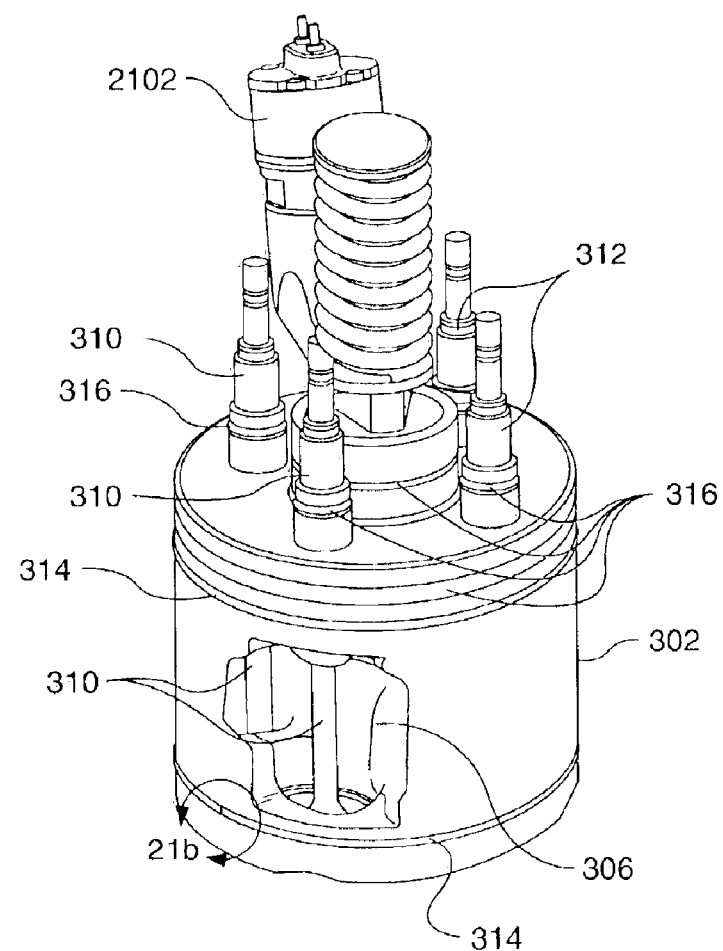
FIG. 21a is a diagrammatic illustration of a cylinder plug assembled with valves and a fuel injector.

Referring to FIG. 4, another view of the cylinder plug 302, i.e., as viewed from the cylinder 610, is shown. Two intake valves 310 and two exhaust valves 312 are shown at the ends which provide communication with the cylinder 610. In addition, a fuel injection port 402 is shown. The fuel injection port 402 provides fluid communication from a fuel injector 2102, located in the cylinder plug 302, to the cylinder 610. An exemplary configuration of a fuel injector 2102 located in a cylinder plug 302 is shown in FIG. 21a.

Referring to FIG. 5, a diagrammatic illustration of another view of the head 106 is shown. Intake ports 502 provide passage of intake fluids to the cylinders 610 by way of intake passageways 306 located on the cylinder plugs 302, which are shown located within the head 106. In addition, a plurality of spool valves 504 are shown mounted to the head 106, the purpose of which is described below.

Figure 7:
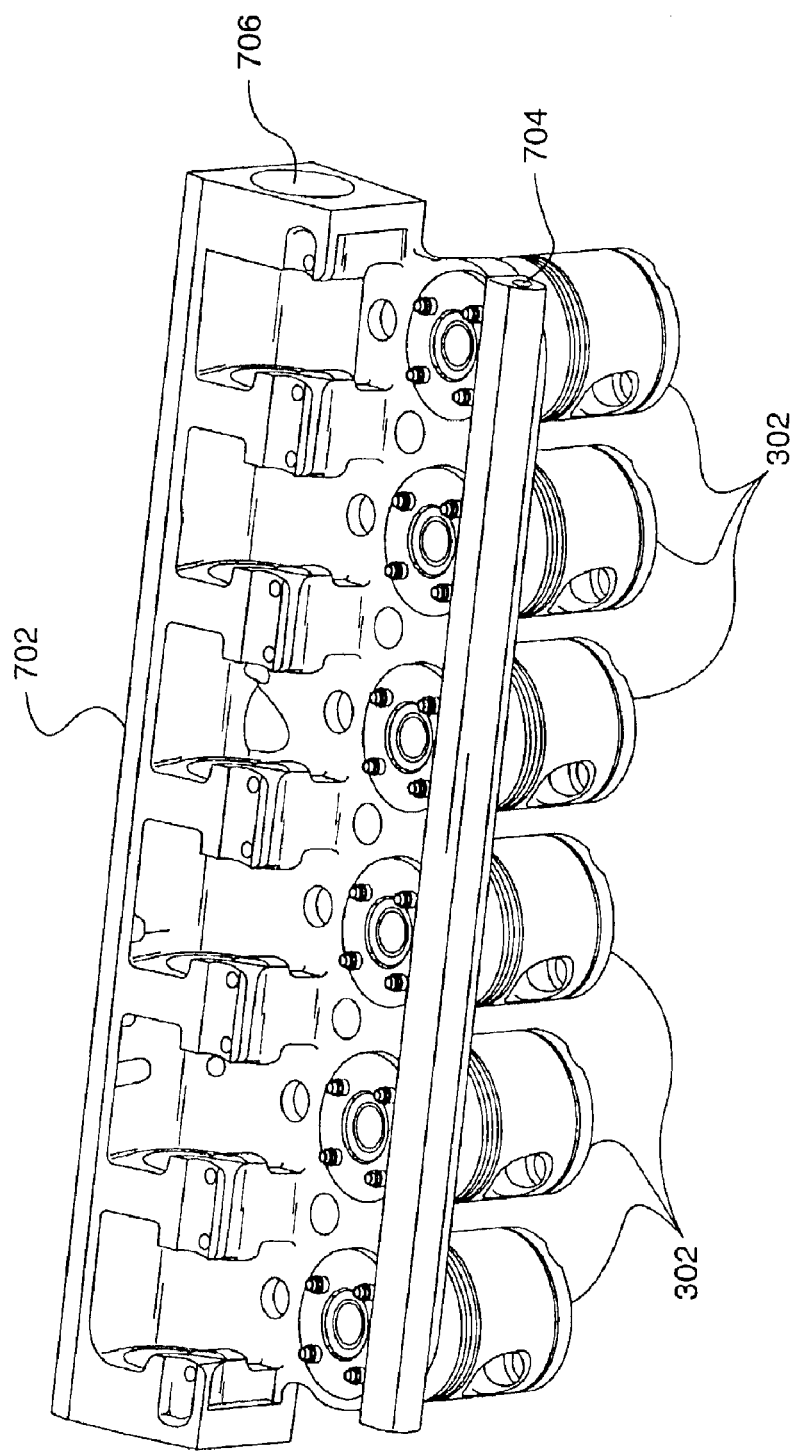
FIG. 7 is a diagrammatic illustration of a platform with cylinder plugs.

As shown in FIG. 5, a portion of each cylinder plug 302 protrudes from the inner portion 204 of the head 106. These portions are in turn connected to a platform 702, as is shown in FIG. 7 and described in more detail below.

Referring to FIG. 6, a diagrammatic illustration of the cylinder plug 302 and a piston 606 in combination with the cylinder 610 is shown. The piston 606 is located in a block portion 604 of the cylinder 610 and typically includes a set of piston rings (not labeled) and is connected to a connecting rod (not labeled), as is well known in the art.

The cylinder plug 302 is located in a head portion 602 of the cylinder 610. The head and block portions 602,604 of the cylinder 610 have diameters that are essentially equivalent, but may differ somewhat to accommodate design specifications for mounting the head 106 to the block 104. The head portion 602 varies in volume as the cylinder plug 302 is controllably moved within the head portion 602. Movement of the cylinder plug 302, and the resultant variance of the compression ratio of the engine 102, is described in more detail below.

The block portion 604 of the cylinder 610 defines a first cylinder portion 612 and the head portion 602 of the cylinder 610 defines a second cylinder portion 614.

Referring to FIG. 7, a diagrammatic illustration of a platform 702 suited for use with the present invention is shown. The platform 702 may include an attached fuel rail 704, for example a high pressure fuel rail to supply fuel to fuel injectors. The platform 702 may also include a camshaft mounting portion 706 suited to support a camshaft used for engine functions which are well known in the art. The platform 702 may also be attached to the cylinder plugs 302 at the portions which protrude from the head 106, as shown in FIG. 5. Preferably, linear movement of the cylinder plugs 302 results in like movement of the platform 702; that is, the platform 702 is configured to follow the movement of the cylinder plugs 302.

Figure 8:
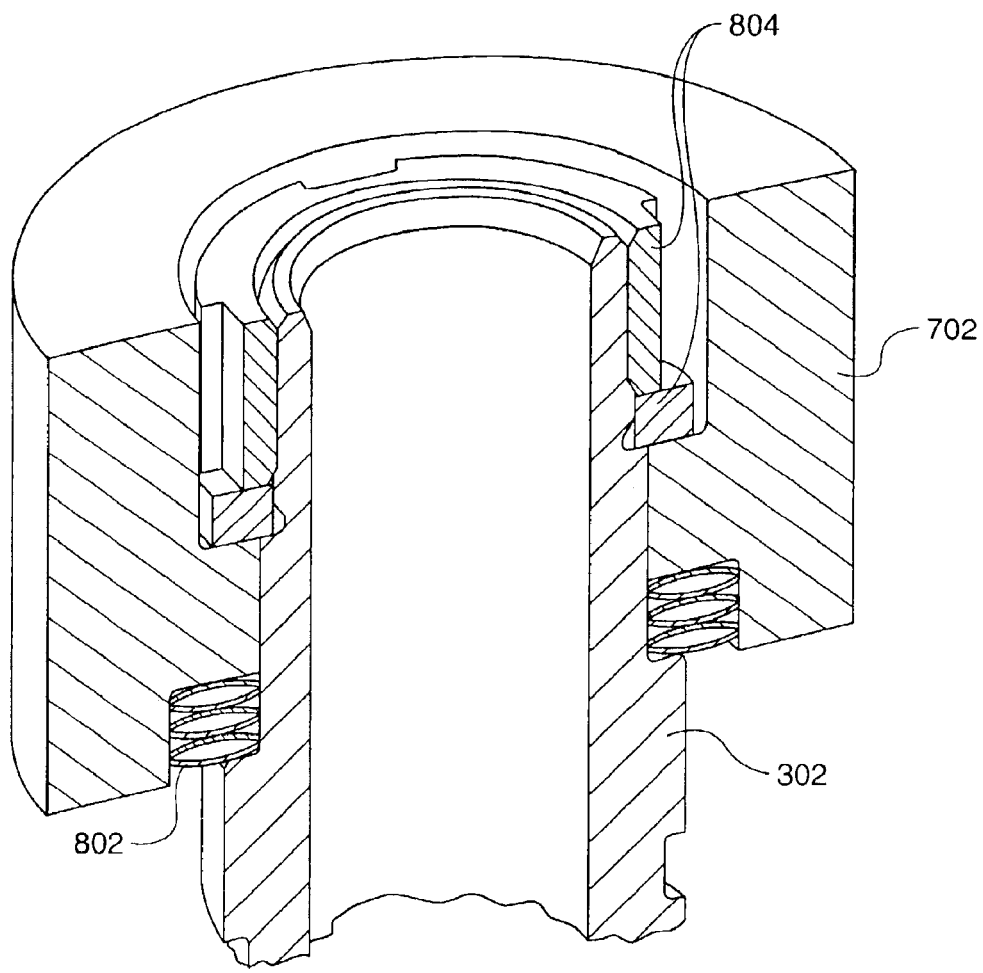
FIG. 8 is a diagrammatic illustration depicting a portion of a cylinder plug attached to a platform.

Referring to FIG. 8, a partial view depicting a portion of the platform 702 attached to a portion, i.e., the protruding portion, of a cylinder plug 302, is shown. A Belleville spring stack 802, i.e., a set of spring portions stacked together, is located between the cylinder plug 302 and the platform 702 such that movement of the cylinder plug 302 in an upward direction, i.e., toward the platform 702, causes the Belleville spring stack 802 to compress, thus absorbing some of the upward forces caused by motion of the cylinder plug 302. In particular, the Belleville spring stack 802 is configured to absorb some of the impact forces caused by combustion pressures in the cylinder 610 against the cylinder plug 302. The Belleville spring stack 802 may include any number of individual springs, for example, 3, 4, 5, or any other number as needed.

A retaining assembly 804 may be connected to the cylinder plug 302 and the platform 702 in such manner as to maintain connection between the cylinder plug 302 and the platform 702 during downward movement of the cylinder plug 302, i.e., movement of the cylinder plug 302 away from the platform 702. The retaining assembly 804 may be configured to preload the Belleville spring stack 802.

Figure 9:
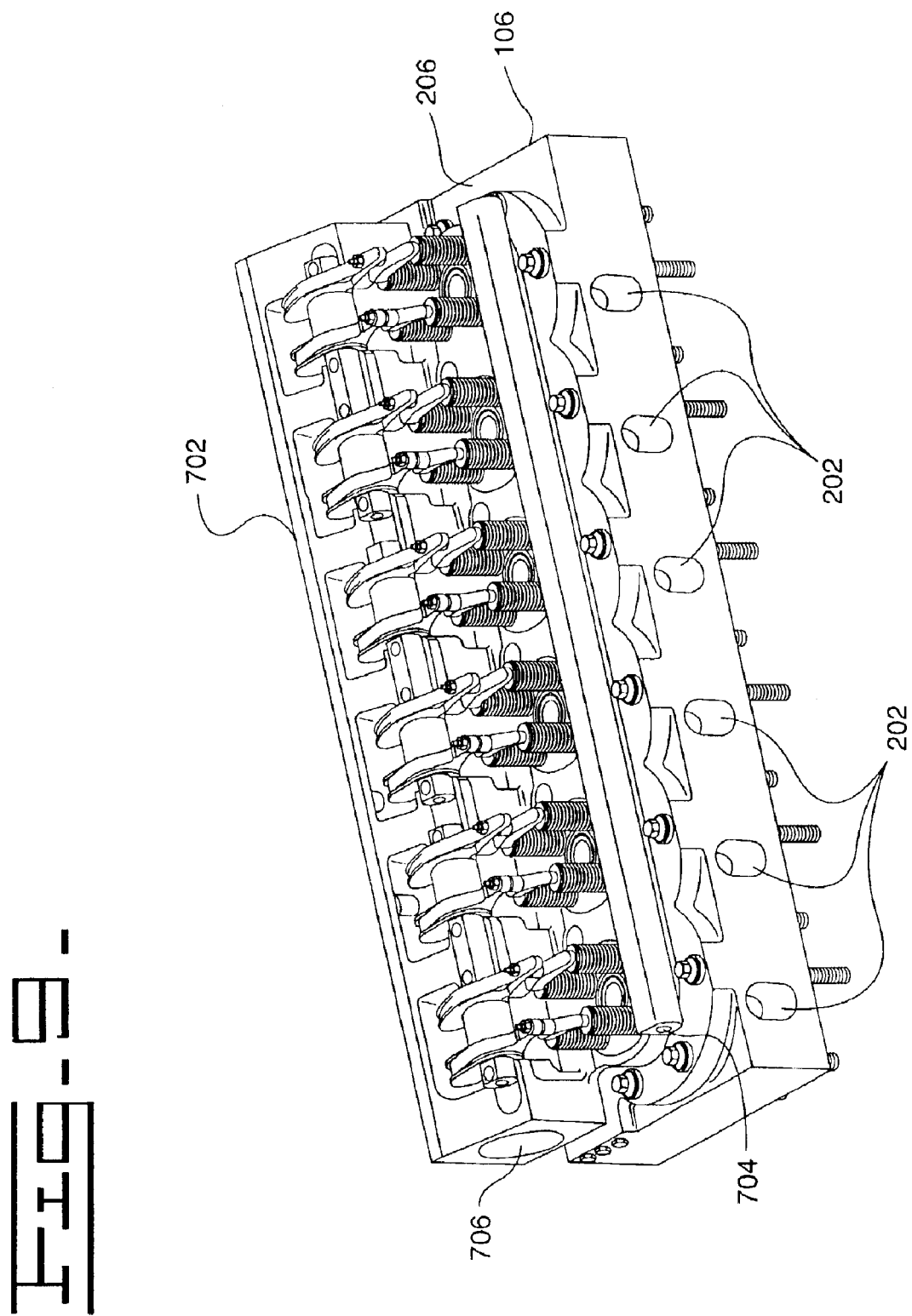
FIG. 9 is a diagrammatic illustration of a platform and head assembly.

Referring to FIG. 9, a diagrammatic illustration of the head 106 and platform 702 assembled together is shown. The platform 702 is located adjacent the outer portion 206 of the head 106. The platform 702, however, is preferably not attached to the head 106, but rather is maintained in position by attachment to the cylinder plugs 302, which are located in the inner portion 204 of the head 106. Thus, the platform 702 is free to move with respect to the head 106 as the cylinder plugs 302 move.

The platform 702 includes a variety of components used for standard operation of an engine 102, including, as shown, rocker arms (not labeled), valve springs (not labeled), and such. Although it is not shown in the drawings, the platform 702 and associated components may be enclosed about the head in a sealed manner, for example by use of a valve cover, as is well known in the art. Such enclosure may allow oil, e.g., lubricating oil, to be circulated about the components for lubrication.

Figure 10:
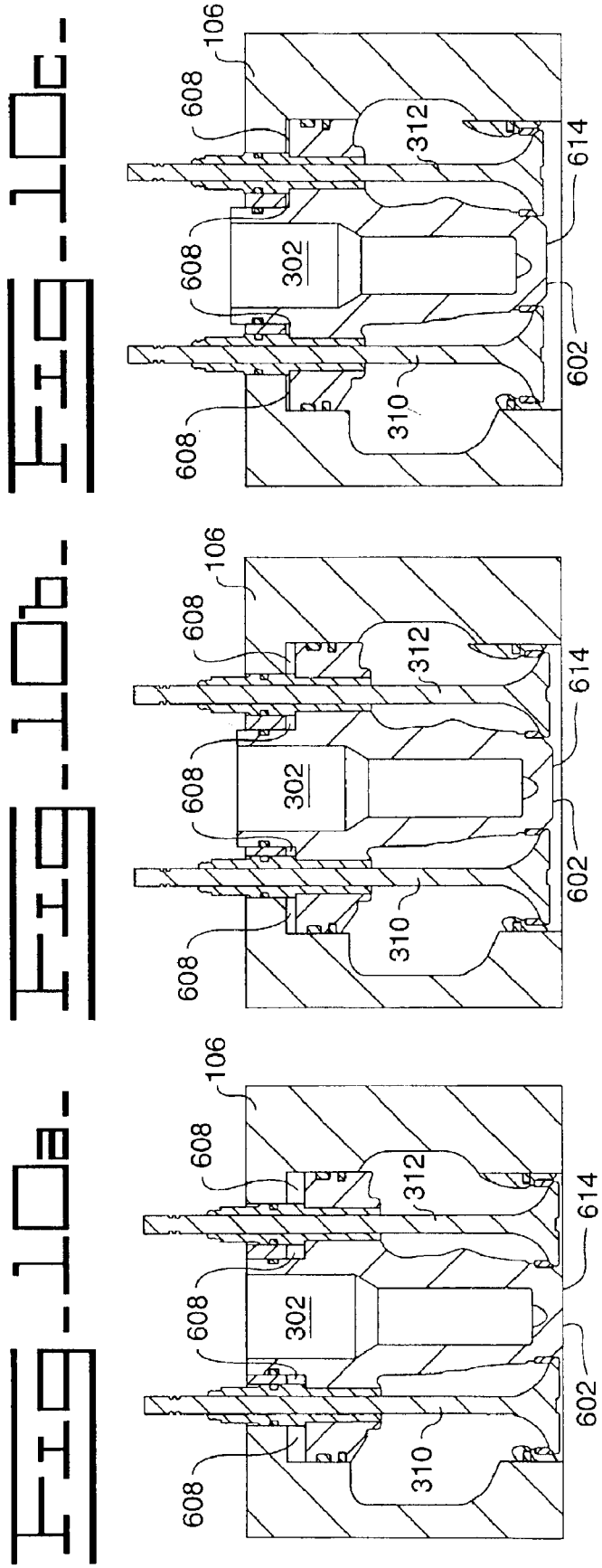
FIG. 10a is a first cross section view of a cylinder plug within a head.
FIG. 10b is a second cross section view of a cylinder plug within a head.
FIG. 10c is a third cross section view of a cylinder plug within a head.

Referring to FIGS. 10a–10c, diagrammatic illustrations of the cylinder plug 302 in various positions within the head 106 are shown. FIG. 10a depicts the cylinder plug 302 fully lowered, i.e., the cylinder plug 302 is positioned such that the head portion 602 of the cylinder 610 has no open volume. In this position, the cylinder 610 entirely consists of the block portion 604 and the compression ratio of the engine 102 is maximum, for example 16:1 or some like value. It is noted that the hydraulic space 608, i.e., the space defined by the cylinder plug 302, the head portion 602 of the cylinder 610 and the head 106, is at a maximum volume as compared to the space 608 in FIGS. 10b and 10c. More particularly, the hydraulic space 608 is shown in position to hold a maximum amount of hydraulic fluid, used to move the cylinder plug 302 to the downward position of FIG. 10a, as is described in more detail below.

In FIG. 10b, the cylinder plug 302 is shown moved upward a slight amount, for example, about 4 mm. In this position, a slight volume of the head portion 602 is added to the overall volume of the cylinder 610, and the compression ratio is reduced by a corresponding slight amount, for example to about 13:1 or some like value. It is noted that the volume of the hydraulic space 608 is reduced, thus corresponding to a controlled release of an amount of hydraulic fluid, thus causing the cylinder plug 302 to move upward to the present position by forces exerted on the cylinder plug 302 from combustion in the cylinder 610.

In FIG. 10c, the cylinder plug 302 is shown moved upward yet another amount, for example about 8 mm total. In this position, an additional volume of the head portion 602 is added to the volume of the cylinder 610, and the compression ratio is reduced still further, for example to about 8:1 or some like value. The volume of the hydraulic space 608 is reduced still further, thus indicating that additional hydraulic fluid has been released, thus resulting in the upward movement shown.

Figure 11:
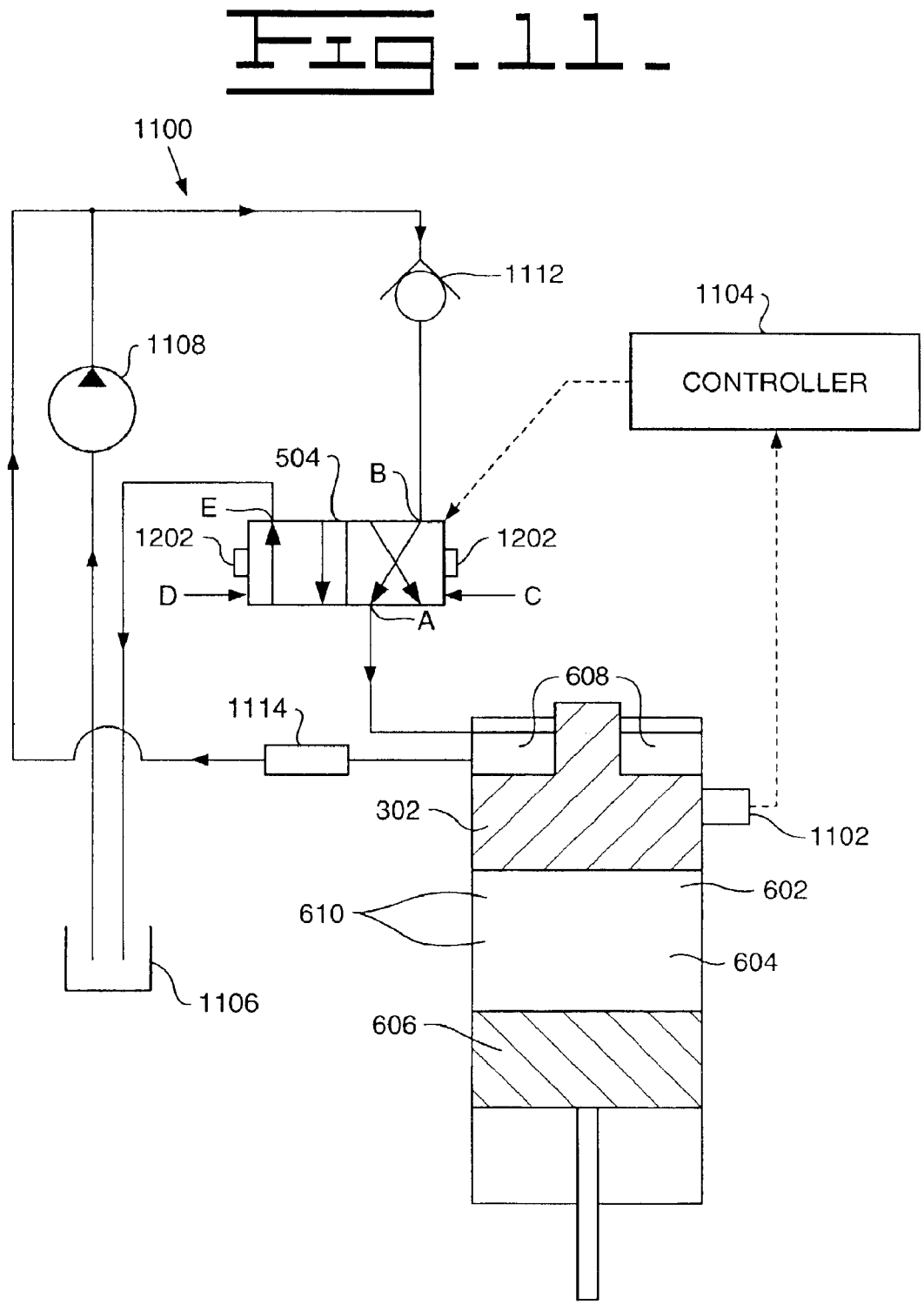
FIG. 11 is a block diagram illustrating an exemplary hydraulic system of the present invention.

Referring to FIG. 11, a block diagram illustrating an exemplary hydraulic system 1100 suited for use with the present invention is shown. A source 1106 of hydraulic fluid provides hydraulic fluid for operation. In the preferred embodiment, the source 1106 includes oil used in the engine 102 for standard lubricating functions, i.e., oil located in a crankcase (not shown). However, other types of hydraulic fluid may be used including, for example, hydraulic fluid in a dedicated hydraulic system.

A pump 1108 provides pressure to deliver the hydraulic fluid throughout the hydraulic system 1100. The pump 1108 may be of any type suited for the purpose and may be located at any suitable position on or near the engine 102.

A check valve 1112 is located in the hydraulic system 1100 to allow fluid to flow in one direction only, i.e., from the pump 1108 to the hydraulic space 608. The check valve 1112 may be a ball-type check valve as shown in FIG. 13, or may be of some other type, as is well known in the art.

A spool valve 504 provides controlled flow of hydraulic fluid to and from the hydraulic space 608. An exemplary spool valve 504 is shown in FIG. 12. The spool valve 504 may be actuated by controlled flow of fluid to ports C and D, for example by control of a pair of electro-hydraulic valves (not shown). The spool valve 504 may include a drain orifice 1202 at each end to provide a drain passage of oil back to the source 1106.

Figure 14:
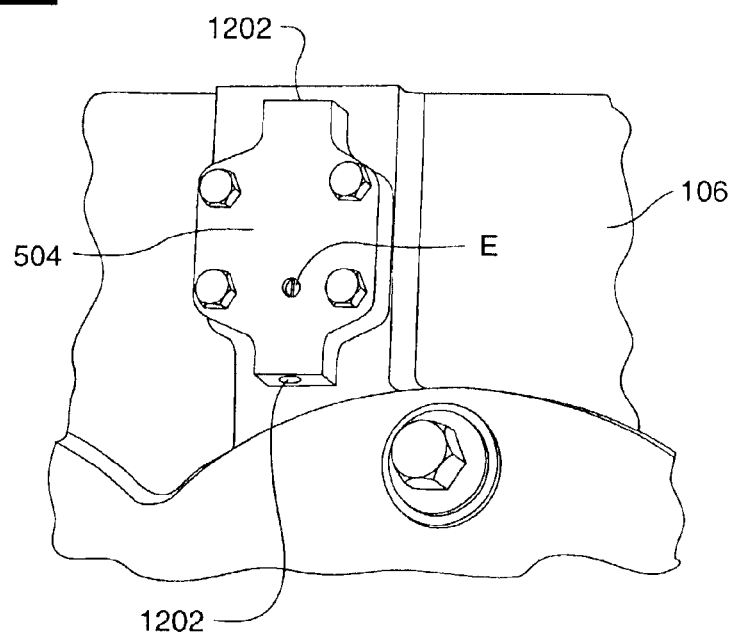
FIG. 14 is a diagrammatic illustration of a portion of a head having a spool valve mounted thereon.
Figure 15:
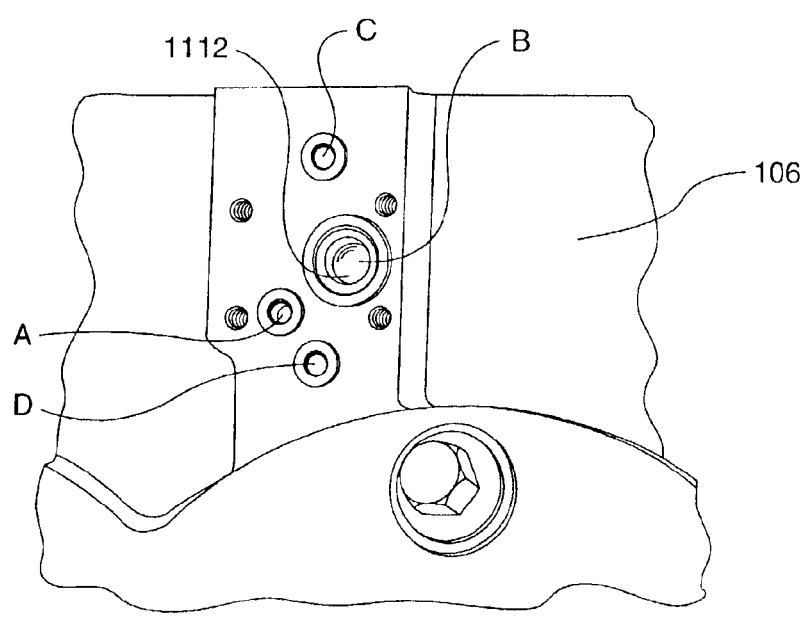
FIG. 15 is a diagrammatic illustration of the portion of a head of FIG. 14 with the spool valve removed.
Figure 15B:
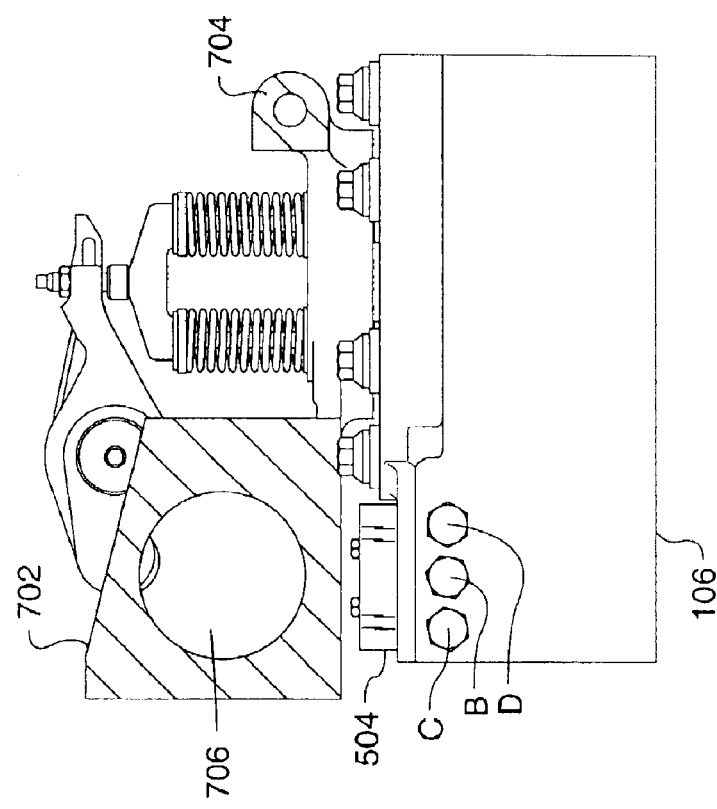
Figure 15A:
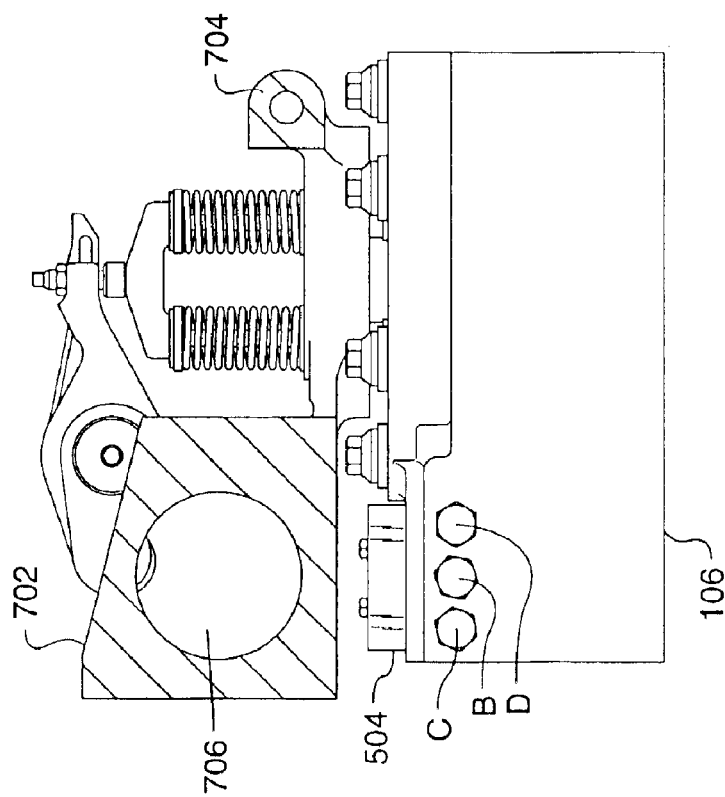

The spool valve 504 may be mounted to the head 106, as shown in FIG. 5 and shown in greater detail in FIG. 14. FIG. 15 depicts the portion of the head 106 shown in FIG. 14 with the spool valve 504 removed. Ports C and D supply oil to the spool valve 504 to actuate the spool valve 504 as described above. The check valve 1112 may be mounted in the head 106, as shown in FIG. 15.

Referring collectively to FIGS. 11, 12, 14 and 15, exemplary operation of the spool valve 504 as depicted in FIG. 12 is shown. Oil supplied to the spool valve 504 by way of port C causes the spool valve 504 to shift to the right, thus providing communication from port B (pump 1108) to port A (hydraulic space 608). Oil then enters the space 608, causing the cylinder plug 302 to move downward, thus increasing the compression ratio. Excess oil from port D may be sent back to the source by way of the drain orifice 1202 located near port D.

Oil supplied to the spool valve 504 by way of port D causes the spool valve 504 to shift to the left, thus providing communication from port A (hydraulic space 608) to port E (back to the source 1106). Oil in the space 608 is then allowed to drain back to the source 1106 and the cylinder plug 302 moves upward from the force of compression, thus decreasing the compression ratio. Excess oil from port C may be sent back to the source by way of the drain orifice 1202 located near port C.

It is noted that, although the spool valve 504 is shown as being of a type that is hydraulically actuated, other types of spool valves may be used. For example, a spool valve that is directly actuated by electro-hydraulic means may be used, thus alleviating the need for additional electro-hydraulic valves.

Referring back to FIG. 11, a bleed orifice 1114 may be used to allow circulation of hydraulic fluid from the hydraulic space 608 to the source 1106. Furthermore, if equipped with a check valve (not shown), the bleed orifice 1114 may also provide relief from excessive pressures in the hydraulic space 608. The bleed orifice 1114 may be of a type that is well known in the art.

A position sensor 1102 may be used to sense the linear position of the cylinder plug 302, e.g., with respect to the head 106. The position sensor 1102 may sense the position of the cylinder plug 302 directly, with one position sensor 1102 being used for each cylinder plug 302 used. Alternatively, the position sensor 1102 may sense the position of the platform 702, which would translate to a position of the cylinder plug 302. In this embodiment, one or more position sensors 1102 may be used to determine the position of multiple cylinder plugs 302. The position sensor 1102 may be any of a variety of types, including but not limited to optical, linear potentiometer, pressure transducer, strain gauge, and the like.

A controller 1104 receives signals generated by the position sensor 1102, compares the sensed position of the cylinder plug 302 to a determined desired position, and controls the hydraulic system 1100 to move the cylinder plug 302 to the desired position. The controller 1104 may be microprocessor-based and may be a dedicated unit or may be part of a controller used for other functions. Although the controller 1104 in FIG. 11 is shown controlling the spool valve 504 directly, it is noted that the controller 1104 may control the spool valve 504 by direct control of other electro-hydraulic valves (not shown), as described above.

Referring to FIGS. 16a and 16b, diagrammatic illustrations of a side view of the platform 702 and head 106 configuration are shown with the platform 702 in two linear positions. In FIG. 16a, the platform 702 is shown raised, i.e., the cylinder plugs 302 have raised, thus lifting the platform 702 with them. In FIG. 16b, the platform 702 is lowered, i.e., the cylinder plugs 302 have lowered, thus lowering the platform 702 with them. It is noted by a comparison of FIGS. 16a and 16b that the components of the platform 702 and the cylinder plugs 302 maintain a constant position with respect to each other, regardless of the position of the platform 702 and the cylinder plugs 302 with respect to the head 106. For example, the camshaft mounting portion 706 (and thus the camshaft), the fuel rail 704, the rocker arms (not labeled), the valve springs (not labeled), the fuel injector 2102 and the valves 310,312 all maintain a constant position with respect to each other. Thus, operation of the engine 102 is not adversely affected by movement of the platform 702 and the cylinder plugs 302.

FIGS. 16a and 16b also indicate exemplary locations of hydraulic ports B, C, and D. These locations may provide a continuous path to supply hydraulic fluid to and from each spool valve 504 located on the head 106.

Referring to FIG. 17, a block diagram showing an exemplary method for maintaining contact of a camshaft 1704 with a crankshaft 1702 is shown. It is well known in the art that a crankshaft is driven by pistons attached to connecting rods in an engine, translating the linear motion of the pistons to a reciprocating motion. It is also well known that a crankshaft in turn drives a camshaft, typically by geared connections, to enable the camshaft to controllably actuate intake and exhaust valves, pumps and the like. In the present invention, the camshaft 1704 is positioned in the camshaft mounting portion 706 of the platform 702, and thus must move linearly with the movement of the platform 702. The crankshaft 1702 is fixed in linear position, and thus some means of maintaining contact between the camshaft 1704 and the crankshaft 1702 must be provided.

A bevel gear drive 1706 having a first pair of bevel gears 1708, a second pair of bevel gears 1710, and a sliding spline coupling 1712 is shown in FIG. 17. The first pair of bevel gears 1708 connects the crankshaft 1702 to the bevel gear drive 1706. The second pair of bevel gears 1710 connects the camshaft 1704 to the bevel gear drive 1706. The sliding spline coupling 1712 connects the first pair of bevel gears 1708 to the second pair of bevel gears 1710 and operates to vary in length in response to linear movement of the camshaft 1704 relative to the crankshaft 1702.

Alternative means to maintain connection between the camshaft 1704 and the crankshaft 1702 may be used without deviating from the spirit and scope of the present invention. For example, a variable tension chain drive (not shown) may be used.

Referring to FIGS. 18 and 19, more detailed diagrammatic illustrations of the apex seal 320 of FIG. 3b are shown. FIG. 18 shows a portion of the apex seal 320 having a raised portion to provide more effective sealant properties. FIG. 19 shows a wave spring 1902 which may be located between the apex seal 320 and the cylinder plug 302, and thus push the apex seal 320 against the head portion 602 of the cylinder 610. It is noted from review of FIGS. 3b and 19 that two apex seals 320 and two cylinder plug piston rings 314 are located to completely enclose the exhaust passageway 304, thus providing complete isolation of the exhaust gases from other portions of the engine 102.

Referring to FIG. 20, a graph 2002 depicting a series of combustion events in the engine 102 is shown. Each peak represents a force of combustion (in Newtons) of a cylinder 610, for example cylinder 1, 5, 3, 6, 2, 4, then 1 again. If it is desired to move the cylinder plugs 302 downward, i.e., toward the block portions 604 of the cylinders 610, it is preferable to move each cylinder plug 302 only during time intervals in which no combustion event is occurring. For example, it is desired to move the cylinder plug 302 corresponding to cylinder 1 during the time interval from after the first combustion peak of cylinder 1 to before the second combustion peak of cylinder 1. In this manner, movement of the cylinder plug 302 does not take place against the opposing force of combustion.

Figure 21B:
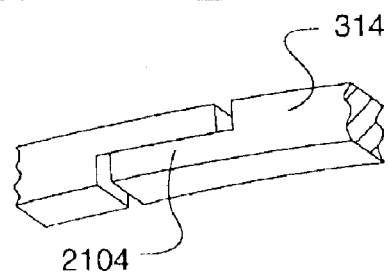

In FIG. 21a, a diagrammatic illustration of a cylinder plug 302 having a fuel injector 2102 and intake and exhaust valves 310,312 is shown. FIG. 21b shows an enlarged view of a segment of a cylinder plug piston ring 314. In particular, FIG. 21b shows an overlapping end gap 2104 of the cylinder plug piston ring 314. The overlapping end gap 2104 provides a more effective seal than typical end gaps which do not overlap.

Figure 22:
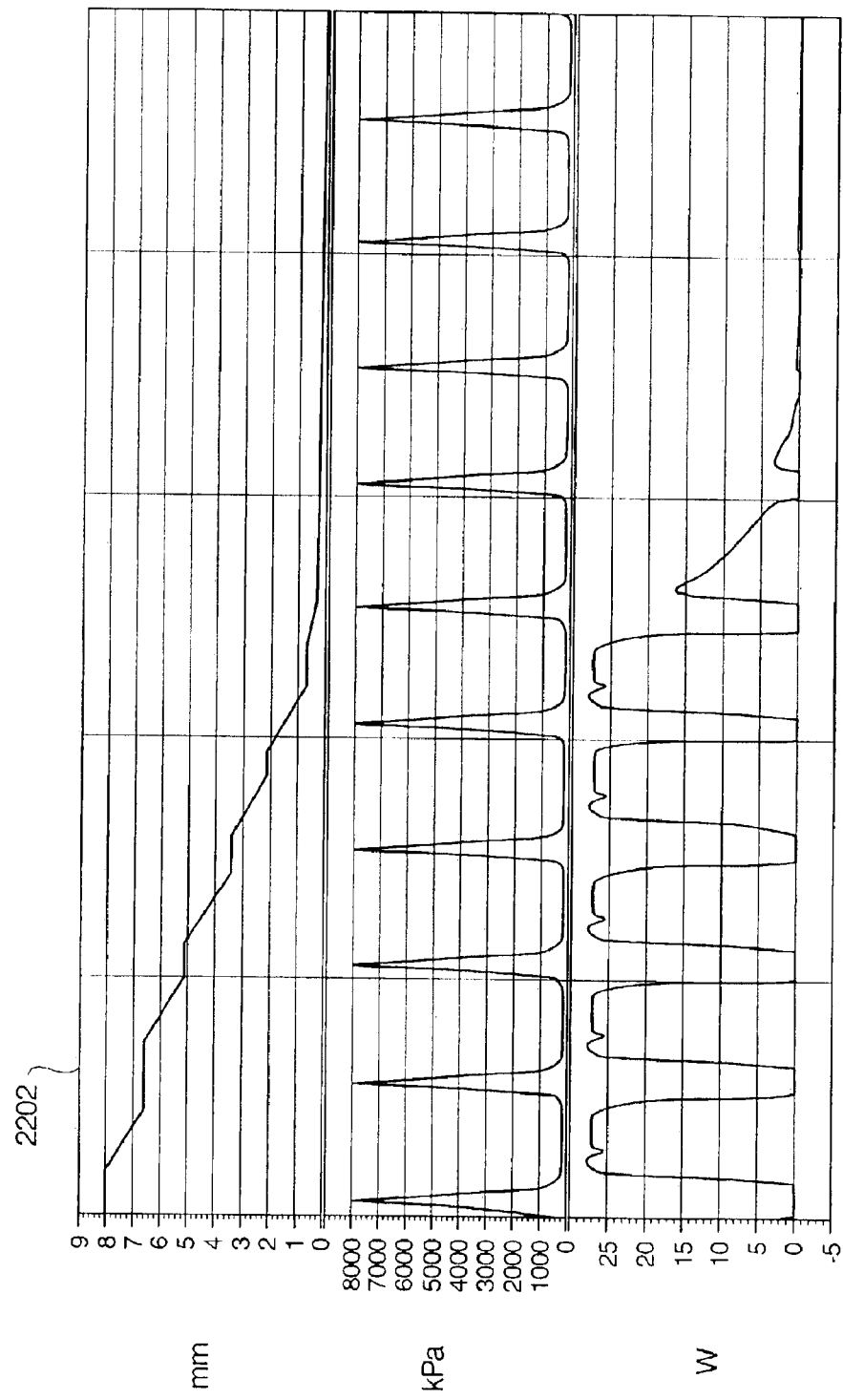
FIG. 22 is a graph depicting control of motion of a cylinder plug during several combustion events.

Referring to FIG. 22, a graph 2202 depicting movement of a cylinder plug 302 during a series of combustion events is shown. For ease of understanding, the events of one cylinder 610 and one cylinder plug 302 only are shown. The graph 2202 includes three plots. The middle plot indicates combustion occurrences of one cylinder 610 over a period of time, i.e., several combustion cycles. The pressure peaks, scaled in kPa, represent the resultant pressure in the hydraulic space 608 caused by the combustion in the cylinder 610. These pressure peaks cause the cylinder plug 302 to resist downward movement from the addition of fluid to the hydraulic space 608.

The lower plot indicates the hydraulic power, scaled in Watts, from the pump 1108 to deliver fluid to the hydraulic space 608. It is noted that fluid is delivered only during time intervals between combustion events, thus eliminating the need to provide large amounts of pump power to overcome the pressures from combustion. In the preferred embodiment, the check valves 1112 isolate the inward flow of hydraulic fluid during combustion by closing during the high pressure spikes caused by the combustion events, thus providing a hydraulic lock when firing loads from combustion occur. More particularly, during combustion, the hydraulic pressure from the combustion event exceeds the hydraulic pressure from the pump 1108, and the check valve 1112 is forced to close until the pressure spike subsides.

The upper plot indicates the distance, scaled in mm, in which the cylinder plug 302 moves in a downward direction in the head 106. It is noted that the cylinder plug 302 only moves downward when power from the pump 1108 is applied, i.e., between combustion events of the cylinder 610. During combustion, hydraulic power is not applied and the cylinder plug 302 remains fairly stationary. As shown in the graph 2202 of FIG. 22, it takes about seven combustion cycles of the cylinder 610 to move the cylinder plug 302 eight mm, i.e., to change the compression ratio from minimum, e.g., about 8:1, to maximum, e.g., about 16:1.

Figure 23:
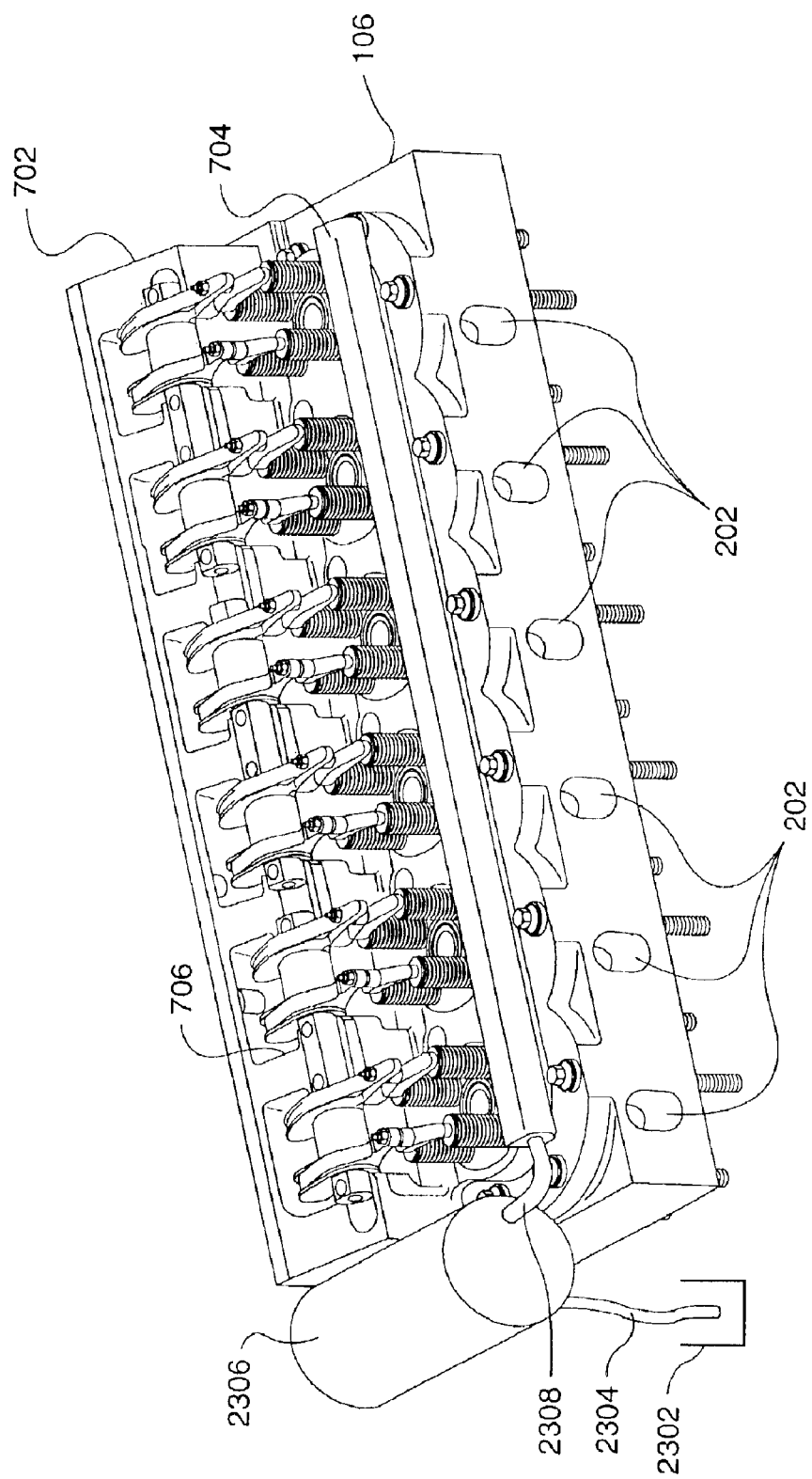
FIG. 23 is a diagrammatic illustration of a platform and head assembly having a fuel pump located thereon.

Referring to FIG. 23, a diagrammatic illustration of the platform 702 having an associated fuel system is shown. A fuel supply 2302 provides fuel by way of a low pressure fuel line 2304 to a fuel pump 2306. The fuel pump 2306 then provides high pressure fuel to the fuel rail 704 by way of a high pressure fuel line 2308. The low pressure components, i.e., the fuel supply 2302 and the low pressure fuel line 2304, may be mounted off the platform 702. The high pressure components, i.e., the fuel pump 2306, the fuel rail 704 and the high pressure fuel line 2308, may be mounted on the platform 702. In this manner, the high pressure components move with the platform 702 and thus may remain fixed in position as the platform 702 moves. The low pressure fuel line 2304 may be flexible, for example a hose, thus allowing relative movement between the platform 702 and the head 106.

Referring to FIG. 24, a diagrammatic illustration of a cross section view of the cylinder plug 302 within the head 106 is shown. Coolant passageways 318 provide passage between the cylinder plug 302 and the head 106 to allow coolant, e.g., water, to flow. Seals 2402 provide isolation between the coolant passageways 318 and the hydraulic space 608. The seals 2402 may be made of any material suitable for the task and are preferably designed to provide isolation during movement of the cylinder plug 302 and are also designed to withstand high temperatures and pressures associated with the cylinder plug 302, the head 106 and the hydraulic space 608.

INDUSTRIAL APPLICABILITY

In operation, the present invention provides a method and apparatus for varying a compression ratio of an engine 102. The method of the invention determines a desired compression ratio, for example to accommodate certain operating conditions such as cold starting, varying load conditions and the like. A desired linear position of the cylinder plug 302 is then determined as a function of the desired compression ratio. For example, various positions of the cylinder plug 302 may correlate to different compression ratios and some means, such as a lookup table, may be used.

The hydraulic system 1100 is actuated to controllably move the cylinder plug 302 to the desired position. The movement may be performed over several combustion cycles to avoid the need for high hydraulic forces. Furthermore, in a multi-cylinder engine, several cylinder plugs 302 will need to be moved. The Belleville spring stacks 802 located between each cylinder plug 302 and the platform 702 limit the transmission of combustion firing loads from the cylinder plugs 302 to the platform 702 and thus provide "cushioning" to allow all of the cylinder plugs 302 to smoothly move the platform 702 during this time period.

Intake and exhaust valves 310,312, and the associated camshaft 1704, and valve components, remain stationary with respect to the cylinder plugs 302 and the platform 702, and thus may be controllably actuated for uninterrupted operation of the engine 102. In addition, the high pressure fuel components, e.g., fuel pump 2306, fuel rail 704, and fuel injectors 2102, remain stationary with respect to the cylinder plugs 302 and the platform 702. Thus, the fuel system components may also be controllably actuated during movement of the cylinder plug 302 and the platform 702 to provide uninterrupted operation of the engine 102.

One application of the present invention may include use with a compression ignition type engine operating in homogeneous charge compression ignition (HCCI) mode. An HCCI engine may operate more effectively at low compression ratios. However, the effectiveness may vary as engine load conditions vary. Thus, a variable compression ratio engine may be able to maintain peak effectiveness under varying engine load conditions. Furthermore, an HCCI engine which operates well with low compression ratios may have difficulty starting under cold start conditions, in which higher compression ratios are more effective.

Other aspects can be obtained from a study of the drawings, the disclosure, and the appended claims.

What is claimed is:

1. An apparatus for varying a compression ratio of an engine having a block and a head mounted thereto, comprising:

a cylinder having a block portion and a head portion;

a piston linearly movable in the block portion of the cylinder;

a cylinder plug that includes a hydraulic actuation surface being linearly movable in the head portion of the cylinder;

a fuel injector located in the cylinder plug and operable to inject fuel into the block portion of the cylinder; and a gas exchange valve located in the cylinder plug and operable to provide controlled fluid communication with the block portion of the cylinder.

2. An apparatus, as set forth in claim 1, wherein the gas exchange valve located in the cylinder plug includes at least one of an intake valve and an exhaust valve.

3. An apparatus, as set forth in claim 2, further including:

an intake valve located in the cylinder plug;

an exhaust valve located in the cylinder plug;

an intake port located in the head;

an exhaust port located in the head;

an intake passageway located in the cylinder plug and operable to provide fluid communication from the intake port to the intake valve; and an exhaust passageway located in the cylinder plug and operable to provide fluid communication from the exhaust port to the exhaust valve.

4. An apparatus, as set forth in claim 3, wherein at least one of the intake and exhaust passageways includes a chamfered surface to provide a fluid transition from a corresponding at least one of the intake and exhaust ports.

5. An apparatus, as set forth in claim 1, further including a hydraulic system operable to controllably move the cylinder plug in the head portion of the cylinder.

6. An apparatus, as set forth in claim 5, wherein the cylinder plug, the head portion of the cylinder, and the head define a space operable to receive a supply of hydraulic fluid.

7. An apparatus, as set forth in claim 6, wherein the hydraulic system includes:

a source of hydraulic fluid;

a pump operable to pressurize the hydraulic fluid for delivery; and a spool valve operable to controllably deliver the pressurized hydraulic fluid to the space defined by the cylinder plug, the head portion of the cylinder, and the head.

8. An apparatus, as set forth in claim 5, further including:

a position sensor operable to sense a linear position of the cylinder plug in the head portion of the cylinder and generate a responsive position signal; and a controller operable to receive the position signal, determine a desired position of the cylinder plug, and responsively control the hydraulic system to move the cylinder plug to the desired position.

9. An apparatus, as set forth in claim 1, further including a platform attached to the cylinder plug and operable to move with the cylinder plug; and a rocker arm supported on, and attached to move with, the platform.

10. An apparatus for varying a compression ratio of an engine having a block and a head mounted thereto, comprising:

a cylinder having a block portion and a head portion;

a piston linearly movable in the block portion of the cylinder;

a cylinder plug linearly movable in the head portion of the cylinder;

a valve located in the cylinder plug and operable to provide controlled fluid communication with the block portion of the cylinder;

a platform attached to the cylinder plug and operable to move with the cylinder plug; and a camshaft mounted thereto, the camshaft being configured to control operation of the valve.

11. An apparatus, as set forth in claim 10, wherein the camshaft is drivably connected to a crankshaft.

12. An apparatus, as set forth in claim 11, wherein the camshaft is configured to linearly move relative to the crankshaft and maintain a constant position relative to the platform.

13. An apparatus, as set forth in claim 12, further including a bevel gear drive connecting the camshaft to the crankshaft, the bevel gear drive including:

a first pair of bevel gears connecting the crankshaft to the bevel gear drive;

a second pair of bevel gears connecting the crankshaft to the bevel gear drive; and a sliding spline coupling connecting the first pair of bevel gears to the second pair of bevel gears and operable to vary in length in response to linear movement of the camshaft relative to the crankshaft.

14. An apparatus, as set forth in claim 10, further including:

a fuel injector located in the cylinder plug and operable to inject fuel into the block portion of the cylinder;

a fuel rail located on the platform and connected to the fuel injector; and a fuel pump located on the platform, drivably connected to the camshaft, and operable to deliver fuel to the fuel injector by way of the fuel rail.

15. A cylinder plug for varying a compression ratio of an engine and linearly movable in a head portion of a cylinder, the cylinder further including a block portion and having a piston located therein, comprising:

an intake valve located in the cylinder plug and operable to provide controlled fluid communication with the block portion of the cylinder; and an exhaust valve located in the cylinder plug and operable to provide controlled fluid communication with the block portion of the cylinder a fuel injector located in the cylinder plug and operable to inject fuel into the block portion of the cylinder.

16. A cylinder plug, as set forth in claim 15, further including:

an intake passageway located in the cylinder plug and operable to provide communication of intake fluid to the intake valve; and an exhaust passageway located in the cylinder plug and operable to provide communication of exhaust fluid from the exhaust valve.

17. A cylinder plug, as set forth in claim 16, wherein the intake passageway includes a chamfered surface to provide fluid communication of the intake fluid.

18. A cylinder plug, as set forth in claim 16, further including at least one coolant passageway located in the cylinder plug.

19. An apparatus for varying a compression ratio of a engine, the engine having a block and a head mounted to the block, comprising:

a first cylinder portion located in the block;

a second cylinder portion located in the head and positioned such that the first and second cylinder portions create a cylinder;

a cylinder plug linearly movable within the second cylinder portion;

a fuel injector located in the cylinder plug and operable to inject fuel into the first cylinder portion;

at least one gas exchange valve located in the cylinder plug operable to provide controlled fluid communication with the first cylinder portion; and a hydraulic system operable to move the cylinder plug to a desired position in the first cylinder portion.

20. An apparatus, as set forth in claim 19, wherein a cylinder plug includes a plurality of cylinder plugs, each cylinder plug being linearly movable within a corresponding one of a plurality of second cylinder portions, each second cylinder portion being associated with one of a corresponding plurality of first cylinder portions to create a plurality of cylinders.

21. An apparatus, as set forth in claim 20, wherein at least one valve includes:

at least one intake valve located in each cylinder plug operable to provide controlled fluid communication with each corresponding first cylinder portion; and at least one exhaust valve located in each cylinder plug operable to provide controlled fluid communication with each corresponding first cylinder portion.

22. An apparatus, as set forth in claim 20, wherein each cylinder plug, each corresponding second cylinder portion, and the head define a space operable to receive a supply of hydraulic fluid.

23. An apparatus, as set forth in claim 22, wherein the hydraulic system includes:

a source of hydraulic fluid;

a pump operable to pressurize the hydraulic fluid for delivery; and a plurality of spool valves operable to controllably deliver the pressurized hydraulic fluid to the space defined by each corresponding cylinder plug, each corresponding second cylinder portion, and the head.

24. An apparatus, as set forth in claim 23, wherein the hydraulic system further includes a plurality of check valves located between the pump and each corresponding spool valve and operable to limit the direction of flow of hydraulic fluid to flow from the pump to each corresponding spool valve.

25. An apparatus, as set forth in claim 23, further including:

a plurality of position sensors, each operable to sense a linear position of each corresponding cylinder plug and generate a corresponding position signal; and a controller operable to receive the position signals, determine a corresponding position of each cylinder plug, and responsively control actuation of each corresponding spool valve to move the cylinder plugs to the desired positions.

26. An apparatus, as set forth in claim 19, further including a platform attached to the cylinder plugs and operable to move with the cylinder plugs.

27. An apparatus, as set forth in claim 26, wherein the cylinder plugs are located within an inner portion of the head and the platform is located at an outer portion of the head.

28. An apparatus for varying a compression ratio of a engine, the engine having a block and a head mounted to the block, comprising:

a first cylinder portion located in the block;

a second cylinder portion located in the head and positioned such that the first and second cylinder portions create a cylinder;

a cylinder plug linearly movable within the second cylinder portion;

at least one valve located in the cylinder plug operable to provide controlled fluid communication with the first cylinder portion;

a hydraulic system operable to move the cylinder plug to a desired position in the first cylinder portion;

wherein a cylinder plug includes a plurality of cylinder plugs, each cylinder plug being linearly movable within a corresponding one of a plurality of second cylinder portions, each second cylinder portion being associated with one of a corresponding plurality of first cylinder portions to create a plurality of cylinders;

wherein each cylinder plug each corresponding second cylinder portion, and the head define a space operable to receive a supply of hydraulic fluid;

wherein the hydraulic system include;

a source of hydraulic fluid;

a pump operable to pressurize the hydraulic fluid for delivery; and a plurality of spool valves operable to controllably deliver the pressurized hydraulic fluid to the space defined by each corresponding cylinder plug, each corresponding second cylinder portion, and the head;

a plurality of position sensors, each operable to sense a linear position of each corresponding cylinder plug and generate a corresponding position signal;

a controller operable to receive the position signals, determine a corresponding position of each cylinder plug, and responsively control actuation of each corresponding spool valve to move the cylinder plugs to the desired positions; and wherein the controller is further operable to control actuation of the spool valves to move the cylinder plugs during time intervals in which combustion in each corresponding cylinder is not occurring.

29. An apparatus for varying a compression ratio of a engine the engine having a block and a head mounted to the block, comprising:

a first cylinder portion located in the block;

a second cylinder portion located in the head and positioned such that the first and second cylinder portions create a cylinder;

a cylinder plus linearly movable within the second cylinder portion;

at least one valve located in the cylinder plug operable to provide controlled fluid communication with the first cylinder portion;

a hydraulic system operable to move the cylinder plug to a desired position in the first cylinder portion;

wherein a cylinder plug includes a plurality of cylinder plugs, each cylinder plug being linearly movable within a corresponding one of a plurality of second cylinder portions, each second cylinder portion being associated with one of a corresponding plurality of first cylinder portions to create a plurality of cylinders;

wherein at least one valve includes;

at least one intake valve located in each cylinder plug operable to provide controlled fluid communication with each corresponding first cylinder portion; and at least one exhaust valve located in each cylinder plug operable to provide controlled fluid communication with each corresponding first cylinder portion;

a platform attached to the cylinder plugs and operable to move with the cylinder plugs; and wherein the platform includes a camshaft mounted thereto, the camshaft being configured to control operation of the intake and exhaust valves.

30. An apparatus, as set forth in claim 29, further including:

a fuel rail located on the platform and connected to each fuel injector; and a fuel pump located on the platform, drivably connected to the camshaft, and operable to deliver fuel to each fuel injector by way of the fuel rail.

31. A method for varying a compression ration of an engine, comprising the steps of:, determining a desired compression ratio;

determining a desired linear position of a cylinder plug located in a head portion of a cylinder as a function of the desired compression ratio;

actuating a hydraulic system to controllably move the cylinder plug to the desired position;

controllably actuating at least one of an intake and an exhaust valve located in the cylinder plug, each valve being operable to provide fluid communication with a block portion of the cylinder from the desired position of the cylinder plug; and controllably actuating a fuel injector located in the cylinder plug, the fuel injector being operable to inject fuel into the block portion of the cylinder from the desired position of the cylinder plug.

32. A method, as set forth in claim 31, wherein actuating a hydraulic system includes the step of actuating a spool valve to control the supply of hydraulic fluid to the cylinder plug.

33. A method, as set forth in claim 31, wherein determining a desired linear position of the cylinder plug includes the step of determining a desired linear position of the cylinder plug with respect to the head portion of the cylinder.

34. A method, as set forth in claim 33, determining a desired linear position of the cylinder plug includes the steps of sensing an actual position of the cylinder plug and determining a responsive desired position.

* * * * *